INVENTOR
WALTER KNAPP
BY
ATTORNEY

Feb. 15, 1955 W. KNAPP 2,702,135

TRANSFER APPARATUS

Filed May 17, 1949 10 Sheets-Sheet 2

INVENTOR
WALTER KNAPP
BY William A. Zalesak
ATTORNEY

INVENTOR
WALTER KNAPP
BY
William A. Zalusak
ATTORNEY

Feb. 15, 1955 W. KNAPP 2,702,135

TRANSFER APPARATUS

Filed May 17, 1949 10 Sheets-Sheet 4

INVENTOR
WALTER KNAPP
BY William A. Zalesak
ATTORNEY

TRANSFER APPARATUS

Filed May 17, 1949

10 Sheets-Sheet 5

INVENTOR
WALTER KNAPP
BY William A. Zalisak
ATTORNEY

INVENTOR
WALTER KNAPP
BY
William A. Zalesak
ATTORNEY

TRANSFER APPARATUS

Filed May 17, 1949

INVENTOR
WALTER KNAPP
BY William A. Zalesak
ATTORNEY

Feb. 15, 1955 W. KNAPP 2,702,135

TRANSFER APPARATUS

Filed May 17, 1949 10 Sheets-Sheet 8

INVENTOR
WALTER KNAPP
BY William A. Zalesak
ATTORNEY

Feb. 15, 1955 W. KNAPP 2,702,135

TRANSFER APPARATUS

Filed May 17, 1949 10 Sheets-Sheet 9

INVENTOR
WALTER KNAPP
BY
William A. Zalesak
ATTORNEY

INVENTOR
WALTER KNAPP
BY William A. Zalesak
ATTORNEY 2,702,135
Patented Feb. 15, 1955

2,702,135

TRANSFER APPARATUS

Walter Knapp, Lancaster, Pa., assignor to Radio Corporation of America, a corporation of Delaware Application May 17, 1949, Serial No. 93,770

12 Claims. (Cl. 214—91)

This invention relates to a transfer system and apparatus for transferring an object from one station to another in a predetermined manner, and more particularly to apparatus for manufacturing cathode ray tubes where objects are transported and inverted between two stations.

Some manufacturing procedures require the transfer of an object such as a work piece from one station to another and in some instances it is desired that the object be delivered to a receiving or disposal station in a position that involves rotation of the object through an arc of 180° from the position it assumed at an initial or delivery station prior to the transfer.

The accomplishment of a transfer of this type involves many considerations. For example, in some instances the normal positions of the object to be moved at the receiving and delivery stations may be so different as to render inoperable at the receiving station an object engaging mechanism suitable for initially gripping the object at the delivery station. Where a manufacturing procedure involves successive transport of an object on a horizontal belt type conveyor and an overhead pendant type of conveyor, a transfer of the object from the belt conveyor to the overhead conveyor is required. Where cathode ray bulbs comprise the objects transported, the bulbs are most conveniently carried on the belt with their faces downward. On the overhead conveyor, however, they are most advantageously carried by tongs engaging the conical portion of their walls and requiring the bulbs to be positioned with their faces extending upwardly.

To transfer a bulb from the belt conveyor to the overhead conveyor gives rise to a serious problem. Thus, where the delivery station comprises a portion of the horizontal belt conveyor and the object rests on the belt, it is more expedient to engage the object at some portion above its base than under its base. However, where the receiving station comprises a carriage or tongs suspended from an overhead rail, the engaging means on the carriage or tongs may seek to engage the object at the portion thereof engaged by the transfer mechanism. Since it is necessary that both the transfer mechanism and the engaging means at the receiving station support the object simultaneously during the relatively short period of transition from one to the other, and that the engaging means on both be relatively closely spaced in order to prevent a long drop of the object and consequent damage thereto, it is sometimes inadvisable at the receiving or disposal station to rely on the original engagement of the object by the transfer apparatus at the initial or delivery station.

In addition, where the object is a cathode ray bulb initially resting on its face on the conveyor belt, it is most advantageously engaged by the transfer apparatus initially by its neck portion. However, a continuance of this engagement during the entire transfer cycle may involve damaging strains on the neck portion, particularly during the part of the cycle involving rotation of the bulb to an inverted position.

Consequently it is desirable in many instances where a transfer apparatus of the type described is used, that several different object engaging means be provided for meeting the requirements of different portions of the cycle of operation of the apparatus, and that means be included in the apparatus for effecting a smooth transfer of the object from one engaging means to another.

Another consideration that is important in instances where the receiving or disposal station involves supporting means suspended from an overhead support, is the fact that travel of the object in a continuous arc from the initial or delivery station to the receiving station may be impossible in view of the fact that the overhead support may extend into the path of travel of the object. While arcuate travel of the object through 180° is required in order to invert it, such travel under the conditions specified may not itself accomplish a complete bridging of the space between the two stations. Accordingly it is desirable that the transfer cycle include partly rectilinear and partly arcuate travel of the object between the two stations.

A further consideration that particularly concerns the portion of the transfer mechanism having the function of inverting the object, is that of power transfer to the mechanism. One power means that finds wide use employs hydraulic pressure transmitted to cylinders by means of conduits. The power source is usually at a fixed location and in order to avoid excessive wear and possible fracture of the conduits it is desirable that the cylinders referred to be substantially fixed in relation to the power source.

Where a transfer apparatus functions between two conveyors to transfer objects from one to the other of such conveyors, and the transfer apparatus is designed automatically to go through a cycle of operation once it has been initiated, it is necessary that the conveyor at the disposal end of the apparatus have a vacant receptacle for receiving the object transported by the apparatus. Obviously if the receptacle on this conveyor is occupied, the conveyor is incapable of receiving delivery of a further object from the transfer apparatus. Such condition may result in breakage of the object attempted to be delivered to the occupied conveyor and possibly serious damage to the transfer apparatus. Accordingly it is advantageous to control the transfer cycle so that it is completed only when a vacancy exists on the conveyor referred to.

In addition to the foregoing problems and considerations involved in a successfully operable transfer mechanism, several others arise which deserve attention. For example, where a transfer mechanism includes a carriage having a relatively large width and the power for moving the carriage is applied at one side thereof, it is desirable that suitable means be provided for controlling the travel of the carriage if such travel is required to be rectilinear. Furthermore, the utilization of commercially available hydraulic cylinders in a power transfer system for providing uni-directional intermittent motion in a straight line presents a problem of economy in the number of such cylinders required and renders desirable the use of a suitable linkage substitute for some of such cylinders. And finally, a serious problem arises where a transfer mechanism involves a plurality of successively movable members, each of which performs a portion of the cycle of operation of the mechanism. For successful operation of the mechanism, it is necessary that each member thereof function in its critical portion of the cycle. If, for example, several transfer units are included in the mechanism, it is necessary that when one of said units is in object delivery position, another unit must be in object receiving position. Failure of this coordination of the several units may result in damage to the object handled by the mechanism as well as to the mechanism itself.

Accordingly it is the object of the invention to provide an improved transfer apparatus for transporting an object from one station to another and for inverting the object during its travel between stations.

Another object is to provide a transfer apparatus suitable for use where the delivery and receiving stations associated with the apparatus require different means for initially engaging an object to be transported and for engaging it when delivered to the receiving station.

A further object is to provide a transfer apparatus capable of engaging, transporting and inverting an object with reduced strains on the object.

Another object is to provide a transfer apparatus between two stations arranged for operation in such a manner as to prevent interference with structural elements of the stations.

A further object is to provide a transfer apparatus actuated by hydraulic means wherein the elements of such means are subjected to a reduced relative movement to preserve the elements against wear and fracture.

Another object is to provide a control for a transfer apparatus to assure a vacancy at a receiving station before the apparatus delivers an object thereto.

A further object is to provide a transfer apparatus having a carriage responsive in rectilinear travel to angularly applied aotuating means.

Another object is to reduce the number of cylinders required in a hydraulic power transfer system for providing a predetermined intermittent straight line motion of an element of a transfer apparatus.

A further object is to coordinate the operations of several elements employed in a multiple unit transfer apparatus to assure a good functioning of said apparatus.

One aspect of the invention includes two spaced conveyors and a transfer apparatus disposed therebetween for transporting an object from one conveyor which may be described as the delivery conveyor, to the other which I shall refer to as the receiving conveyor, and inverting the object during transit.

More specifically, the delivery conveyor may comprise an endless belt having a horizontal portion on which cathode ray bulbs may rest with their flat face portions engaging the upper surface of the belt. The receiving conveyor may comprise a plurality of pairs of tongs suspended from an overhead rail. Each pair of tongs is adapted to support a bulb by engaging the conical wall portion thereof.

For convenience in describing an embodiment of the transfer apparatus of the invention, it may be considered as constituting two transfer mechanisms successively engaging the object to be transferred. The mechanism that first engages the object will be referred to hereinafter as the first transfer mechanism and includes two oppositely disposed units, each of which engages an object on the delivery conveyor and transports it to the other of said transfer mechanisms, which will hereinafter be referred to as the second transfer mechanism. The second transfer mechanism also includes two units, one of which comprises a cradle mounted for rotation through an arc of 180° and the other of which comprises a carriage mounted for rectilinear movement on the cradle.

Each of the two units of the first transfer mechanism includes an elongated support mounted for vertical and arcuate motions and having at one end thereof a pair of cooperating fingers or jaws for engaging the neck portion of a cathode ray bulb. The carriage of the second transfer mechanism includes a platform for receiving the face portion of a bulb and a pair of arms for engaging the conical wall portion of the bulb for holding the bulb firmly against the platform. Suitable actuating means including a hydraulic system, serve to impart movement to the several movable elements of the apparatus in a predetermined sequence. The apparatus also includes several safety devices for assuring unimpeded and correct operation of the apparatus.

Further objects and features of the invention will become evident as the present description continues.

Referring to the drawing.

Figure 1:
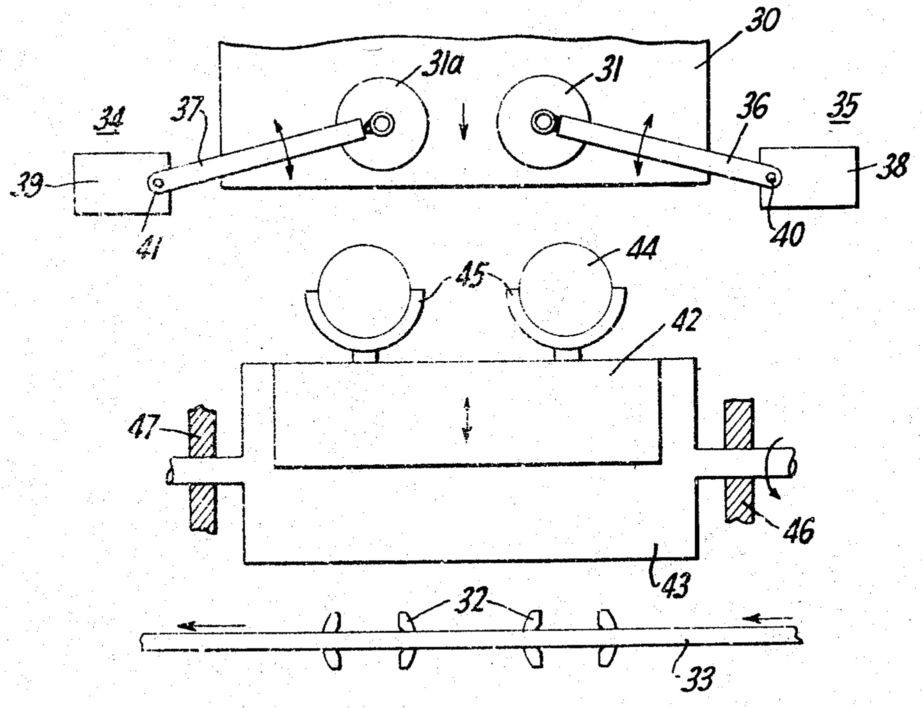
Figure 1 shows schematically a plan view of the apparatus of the invention and depicts the two transfer mechanisms thereof in association with a belt type conveyor and an overhead pendent type of conveyor and indicates the motions described by the several parts of the apparatus in transferring an object from the belt conveyor to the overhead conveyor.

While the several figures of the drawing illustrate one embodiment of my invention it is to be understood that it is not limited thereto but that variations may be made both in the character of the stations between which my transfer apparatus operates as well as in the type of object or work piece it is intended to transport, and suitable modifications may be made in my apparatus to accommodate any predetermined type of station and work piece, without departing from the invention.

Figure 2:
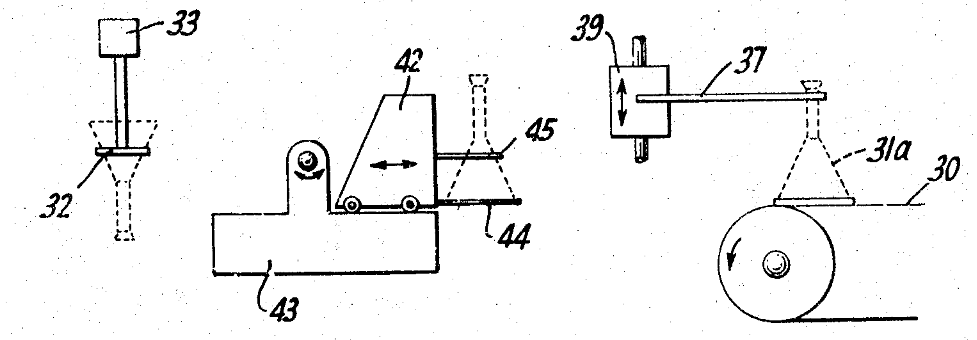
Figure 2 is a schematic side view of the apparatus shown in Figure 1 and indicates further motions of parts of the apparatus in accomplishing a transfer.

Referring now in more detail to Figures 1 and 2, there is shown schematically one way of carrying out the invention. The delivery station from which the object is to be transferred comprises a terminal portion of endless belt 30 having a flat horizontal surface on which an object such as a cathode ray bulb 31 or 31A rests with its face down and with its neck portion extending upwardly. The receiving or disposal station to which the object is to be transferred may comprise an overhead conveyor including tongued receptacles 32 suspended from an overhead rail 33. Such receptacles are described and claimed in co-pending application of M. R. Weingarten, Serial No. 53,341, filed October 7, 1948, now Patent No. 2,595,182, and assigned to the same assignee as the present application.

Between the two stations referred to is a transfer apparatus including a first and second transfer mechanism. The first transfer mechanism includes two oppositely disposed units 34 and 35 including arms 36, 37 mounted on supports 38, 39 which are pivoted at 40, 41 for movements in vertical and horizontal planes. The free ends of the arms 36, 37 are adapted to engage the neck portions of cathode ray bulbs 31, 31*a*. The second transfer mechanism includes a carriage 42 supported on cradle 43 for rectilinear movement thereon. Supported on the carriage are two object engaging members each including a platform 44 for engaging the face of a cathode ray bulb, and a pair of arms 45 movable vertically for engaging the cone portion of the bulb and holding the bulb securely against the platform 44. The cradle 43 is supported on bearings 46, 47 for rotation through an arc of 180° in a vertical plane.

In operation, arms 36, 37 engage the neck portion of bulbs 31, 31*a* on belt 30, and the carriage 42 is caused to move to the end of cradle 43 facing belt 30, with the arms 45 of its object engagement members, raised. Arms 36, 37 then rise to lift the bulbs from the belt and are caused to move arcuately in a horizontal plane on pivots 40, 41 to a position where the bulbs are over the platforms 44. The arms 36, 37 are then lowered to permit the bulbs to rest on the platforms 44. Arms 45 are then lowered to engage the conical portions of the bulbs to hold the bulbs firmly in place. Suitable gripping tongs or fingers on arms 36, 37 which engage the bulbs and which will be more fully described herein are then released. Arms 36 and 37 are then swung forward toward the belt 30 and further lowered toward the belt to engage fresh bulbs. Before the fresh bulbs are transported, however, the second transfer mechanism proceeds through a full cycle of operation which includes moving the carriage rectilinearly to a position intermediate the ends of the cradle 43, rotating the cradle through an arc of 180° in a vertical plane to invert the carriage and the bulbs supported thereon, moving the carriage rectilinearly toward the overhead conveyor receptacles 32, lowering the arms 45 to permit the bulbs to drop a relatively short distance for engagement by the receptacles 32, moving the carriage 42 back to its intermediate position on the cradle 43, rotating the cradle through an arc of 180° in a reverse direction to that of the first rotation, and moving the carriage 42 to the end of cradle 43 facing belt 30 to be in readiness for receipt of two fresh bulbs.

It will thus be noted that the first transfer mechanism serves to transport the object successively rectilinearly in a vertical plane and arcuately in a horizontal plane from a delivery station to the second transfer mechanism by which the object is further transported successively rectilinearly in a horizontal plane and arcuately in a vertical plane for delivery in inverted position to a receiving station spaced from said delivery station.

The foregoing description of a schematic representation of an aspect of the invention as illustrated in Figures 1 and 2, has omitted therefrom reference to many other aspects and features of the invention, such as the actuating means and control mechanisms, and such other aspects and features as well as further details of the invention, will now be described.

Figure 3:
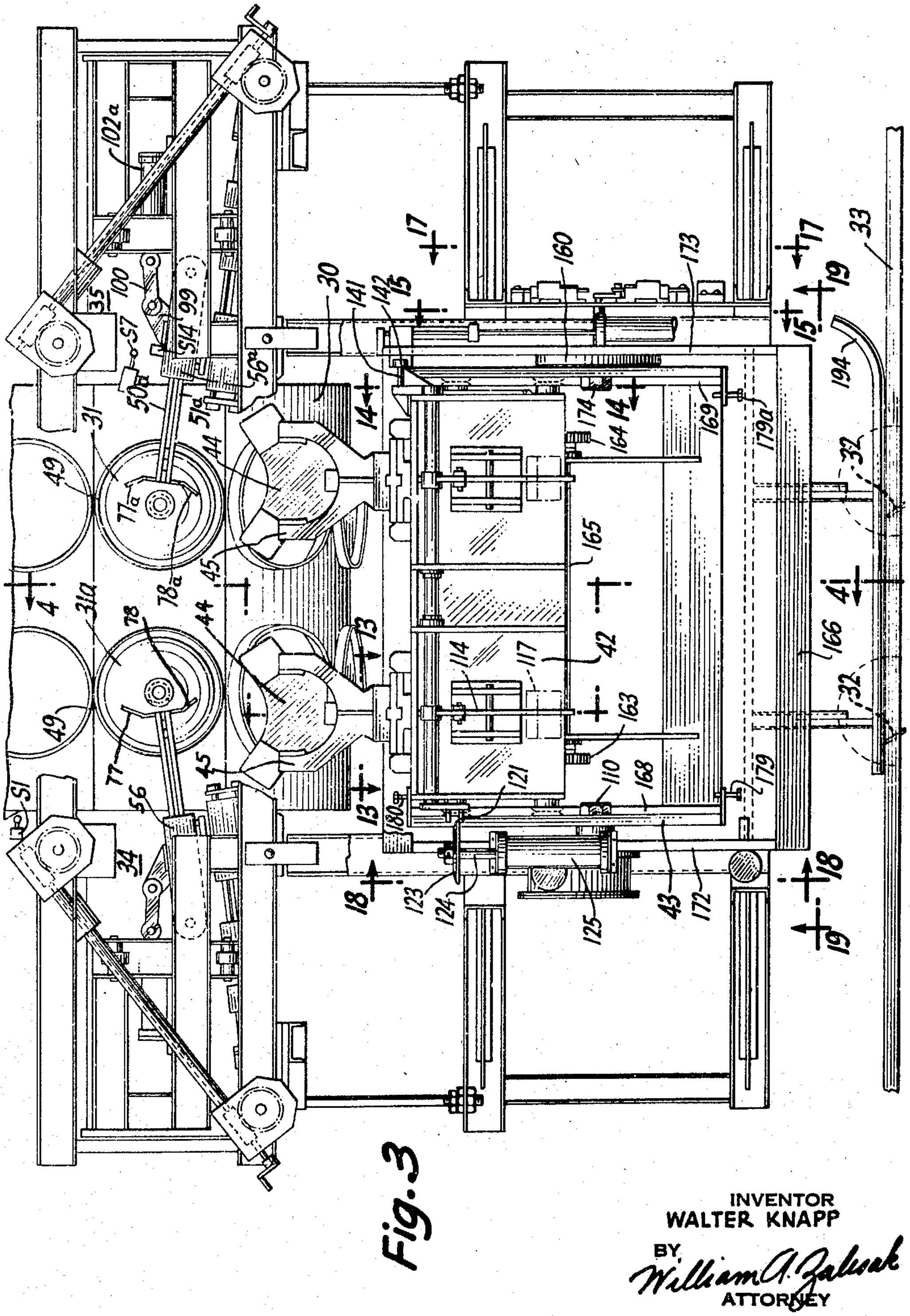
Figure 3 is a plan view of the transfer apparatus and shows its relationship to two spaced conveyors.
Figures 4, 5, 6:
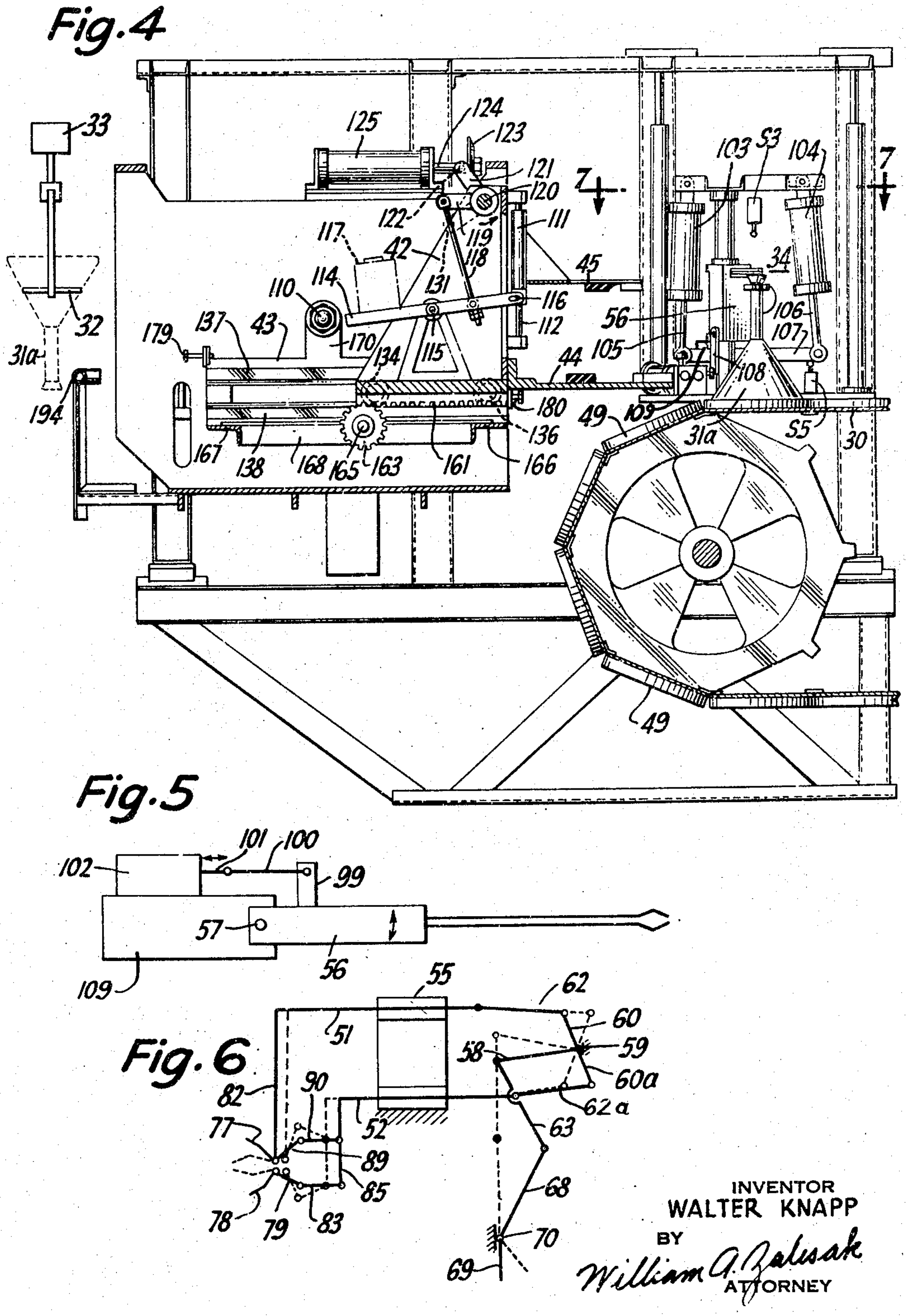
Figure 4 is a longitudinal section along the line 4—4 of Figure 3.
Figures 5 and 6 are schematic illustrations of the linkage system employed in the first transfer mechanism of the apparatus of the invention.
Figures 21, 22:
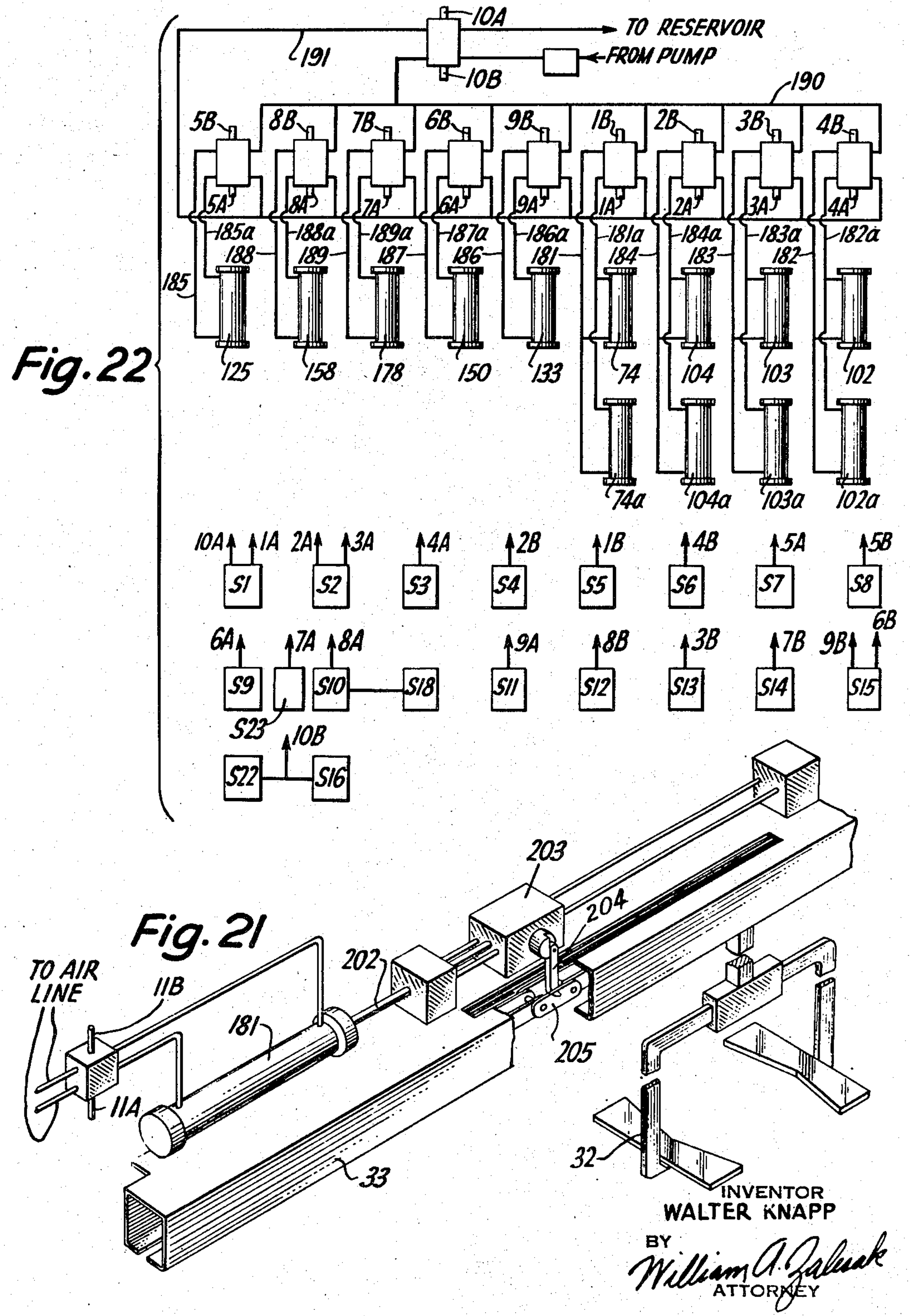
Figure 21 shows a further safety device for controlling the operation of the transfer apparatus as well as a view of a receptacle of the overhead conveyor.
Figure 22 shows schematically the hydraulic and switching system for actuating the transfer apparatus of the invention.

Referring to Figures 3 and 4, my novel transfer apparatus is shown as an element of a conveyor system that includes endless belt 30 and an overhead conveyor including tongs 32, as best shown in Figure 21, suspended from an overhead rail 33. The transfer apparatus includes a first transfer mechanism comprising two oppositely disposed units 34, 35 and a second transfer mechanism comprising a carriage 42 mounted on cradle 43. The operation of the two transfer mechanisms, the belt 30 and the conveyor tongs 32, is coordinated by a switching system to be more fully described hereinafter. Both transfer mechanisms are actuated by a hydraulic system including a plurality of hydraulic cylinders and solenoid valves as will more fully appear as the description continues.

Endless belt 30 may have affixed thereto suitable holders 49 for holding cathode ray bulbs 31, 31*a* in face down position on the upper surface of the belt during its travel. Suitable means, not shown, are provided for causing the belt 30 to travel in intermittent motions, each being of a magnitude sufficient to dispose a pair of bulbs in operative relation to the transfer apparatus. Endless belt 30 is so disposed with respect to the transfer apparatus that the position of two bulbs at a terminal position of the belt adjacent one end thereof renders them in operative relation with respect to the transfer apparatus.

*The first transfer mechanism*

The first transfer mechanism includes two similar units, 34, 35, oppositely disposed and symmetrically arranged with respect to the belt 30 and the second transfer mechanism. Since the two units are similar in structure and function, the description of the first transfer mechanism will be limited to one unit thereof.

Figure 7:
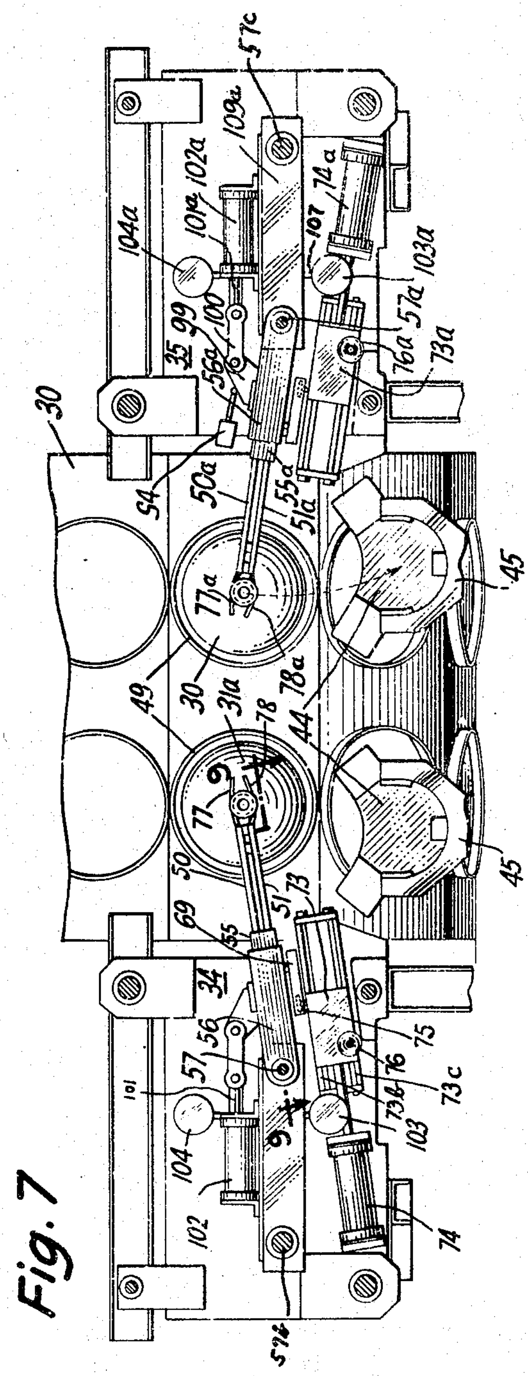
Figure 7 is a view partly in section along lines 7—7 of Fig. 4 and shows the first transfer mechanism with the object engaging fingers thereof closed around an object such as the neck portion of a cathode-ray bulb preparatory to lifting it and longitudinally moving it to the second transfer mechanism.

The one unit of the first transfer mechanism selected for description of the mechanism for opening and closing the object engaging fingers thereof and for horizontally moving the object, is shown in plan view in Figures 3 and 7 and is denoted generally by the numeral 34. It is shown in more detail in Figures 9, 10, 11, and 12. For a description of the lifting mechanism of this unit, reference will also be made to unit 34 which shows this mechanism in Figure 4 more clearly. For a general understanding of the linkage systems employed for lifting and arcuately moving certain members of the unit, reference will be made to Figures 5 and 6.

The functions to be performed by each of the units 34, 35 are to suitably engage an object such as a cathode ray bulb presented to it in a suitable manner, as by a belt type conveyor, and carry it to the second transfer mechanism. To this end means are provided on each unit for gripping the object in the most advantageous manner, as by the neck portion when the object is a cathode ray bulb. The gripping means is mounted on a movable support which is actuated vertically to lift it from the belt. It is then actuated horizontally and caused to swing on a vertical pivot for transporting the object horizontally a predetermined distance until it is in position for engagement by the second transfer mechanism.

In first describing the mechanism for opening and closing the object gripping means and for horizontally moving said means and the object engaged thereby, reference will be made to unit 34 shown best in Figures 7, 9 and 10.

Unit 34 comprises an elongated structure including housing 56, slide supports 54 and 55, supporting four bars 50, 51, 52, 53 (see Figures 10) slidably engaged at one end portion thereof. The bars support at their free ends the object gripping fingers or jaws 77, 78. The housing 56 is disposed at one end portion of the elongated structure referred to and is pivoted at 57 for arcuate motion in a horizontal plane.

Figures 9, 10, 11:
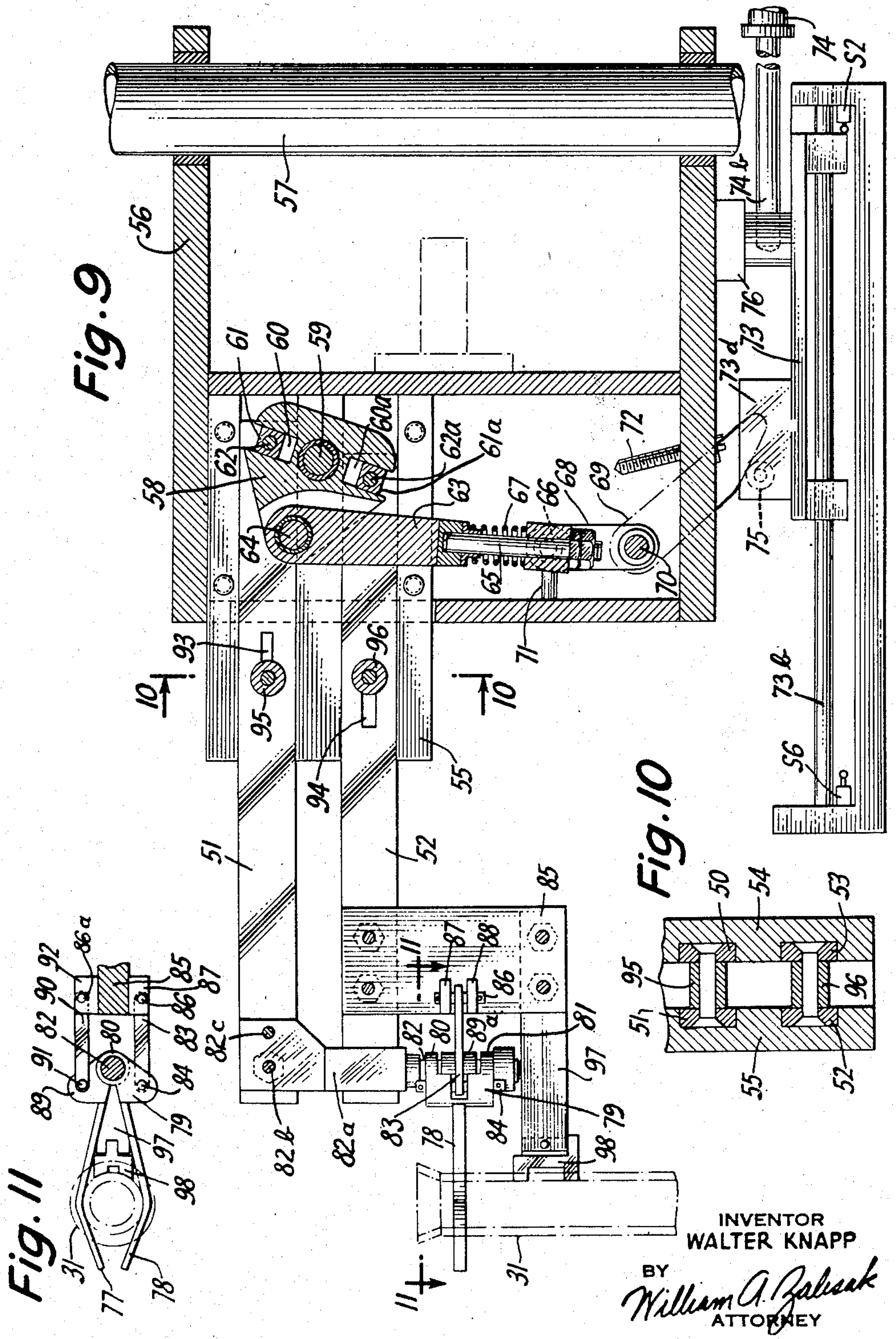
Figure 9 is a longtudinal section of the left hand unit of the first transfer mechanism as viewed in Fig. 7 along the line 9—9 of Figure 7 and shows the actuating means for opening and closing the object engaging fingers thereof.
Figure 10 is a cross-section along the line 10—10 of Figure 9 and shows the support for the sliding members of the finger actuating means.
Figure 11 is a view partly in section along the line 11—11 of Figure 9 and depicts the linkage system utilized in opening and closing the object engaging fingers, and shows the fingers in closed position.

The fingers or jaws 77, 78 are fixed to links 89, 79, respectively, as shown in Figs. 9 and 11. Link 79 is U-shaped and includes two legs, having collars 80, 81. Link 89 is provided with a collar 89*a*. Both links are pivotally mounted on shaft 82 with the collars on the links threaded on the shaft and with link 89 disposed between the collars 80, 81 of link 79. Shaft 82 is fixed to bracket 82*a* which in turn is mounted on the upper bars 50, 51 adjacent the free ends of these bars, and suitably fixed against movement relative to said bars by appropriate means such as bolts 82*b*, 82*c*. Bracket 82*a* is disposed between the upper bars 50, 51 and extends downwardly between the lower bars 52, 53 where it is free to move longitudinally of the last mentioned bars.

The links 79, 89 include extended flat portions shown in Fig. 11 having pins 84, 91 fixed thereto which pivotally engage one end of links 83, 90, respectively. The other ends of links 83, 90 pivotally engage pins 86, 86*a* supported on lugs fixed to the bracket 85. This bracket is fixedly mounted on and depends from the lower bars 51, 53 near the free ends of said bars. Pin 86 is supported by the lugs 87, 88 shown in Fig. 9, while pin 86*a* is supported by a similar pair of lugs extending from the other side of bracket 85, the upper of such lugs 92 being shown in Figure 11.

For steadying an object such as a cathode ray bulb when engaged by the fingers or jaws 77, 78 there is provided an extension 97 on the bracket 85 for supporting a member 98. Member 98 is adapted to engage the neck of a bulb when the fingers or jaws referred to are closed around the neck, as shown in Fig. 9.

The links 79, 89 and links 83, 90 constitute one part of a linkage and lever system for actuating the fingers or jaws 77, 78 to closed and open positions. The other parts of the system include sliding bars 50, 51, 52, 53 and a linkage and lever system within housing 56, shown best in Figs. 9 and 10.

The bars 50, 51, 52, 53 are provided with slots 93, 94 through which pins 95, 96 extend. The pins 95, 96 are fixed to the upper and lower bars, respectively. The slots referred to are elongated to permit relative longitudinal movement between the upper bars 50, 51 and the lower bars 52, 53.

The linkage and lever system within housing 56 includes crank 58 pivoted on shaft 59 and having slots 60 and 60*a* engaging bushings 61 and 61*a*, which may be square as shown in Fig. 9. Bushings 61 and 61*a*, are rotatably mounted on pins 62, 62*a* fixed to the upper and lower pair of bars respectively. Crank 58 is pivotally connected to one end of link 63 by means of pin 64. The free end of link 63 includes a rod 65 welded thereto and has an axial movement with arm 68 through the intermediary of the pivotal connector 66. Spring 67 maintains tension between link 63 and arm 68. As shown, it is in a closed position locked by the pivoting action slightly past center and the nuts at the lower end of rod 65 should be projected below the pivotal position 66. The nuts engage the bottom of the pivotal connector 66 when the rotation of the shaft is reversed causing positive action to open the gripper.

Arm 69 is in turn mounted on shaft 70 and keyed thereto. Stop members 71 and 72 are provided to engage arm 68 of the lever to limit the magnitude of rotation of the lever. Suitable means to be described below are provided for tripping the lever arm 69.

The means for tripping the lever 69 as shown best in Fig. 9, includes a slide 73 mounted for sliding movement on a pair of rods 73*b*, 73*c* shown in Fig. 7, one of said rods 73*b*, being shown in Fig. 9. Fixed to carriage 73 is a bracket 73*d* having a lug 75 extending therefrom. Another lug 76 is directly fixed to the carriage 73 and spaced from lug 75. Operatively connected to the lug 76 is a piston rod 74*b* associated with cylinder 74 for causing the slide 73 to travel back and forth on the rods 73*b*, 73*c*.

The slide 73, and the lugs 75, 76 thereon are so disposed with respect to the housing 56 that in different positions of said housing, different ones of said lugs will engage and trip the lever 69 in different directions. These different actuations of the lever arm 69 will result in the opening and closing of the fingers 77, 78, as shown on Figures 11 and 12.

It will thus be noted that the linkage and lever system in housing 56 is responsive to the tripping of lever arm 69 to impart relative longitudinal movement to the upper and lower pairs of bars 51 and 52 referred to. The linkage system at the free ends of the bars, including the links 79, 89 and links 83, 90, previously described, serves to translate this relative longitudinal movement of the bars into an opening and closing of the fingers 77, 78.

In addition to the mechanism for actuating the fingers 77, 78 to open and closed positions, the two units of the first transfer mechanism being described also are associated with actuating means for imparting vertical motion and arcuate motion in a horizontal plane to the units.

The vertical and arcuate motions referred to involve supports 109, 109*a*, which support housings 56, 56*a* and which are mounted on shafts 57, 57*a*, 57*b*, 57*c* as shown in Fig. 7, for vertical travel thereon. This vertical travel is controlled by hydraulic cylinders and a leakage system to be described. The vertical travel of supports 109, 109*a* also results in vertical travel or motion of the housings 56, 56*a*, supported on said supports. The housings 56, 56*a* however, are supported on shafts 57, 57*a*, respectively, for pivotal movement thereon. This pivotal or arcuate movement of housings 56, 56*a* is controlled by hydraulic means fixed to the supports 109, 109*a* and to the housings 56, 56*a* and adapted to provide relative movement between the housings and supports referred to. In view of the pivotal mounting of the housings 56, 56*a* this movement is restricted to arcuate motion of the housings. A more detailed description of the means for vertically and arcuately moving the housings 56, 56*a* of the units 34, 35 of the first transfer mechanism follows.

The vertical actuating means for units 34, 35 is best shown in Figure 4 in association with unit 34 of the first transfer mechanism. This actuating means includes two cylinders 103, 104 supported on fixed structural elements of the mechanism and connected to a hydraulic system to be more fully described and from which extend piston rods 105, 106. The free ends of the piston rods are pivotally connected to opposite ends of lever 107. Intermediate the ends of lever 107 but closer to piston rod 105 than to piston rod 106, the lever is pivotally connected to a bracket 108 depending from support 109. This linkage system including the two cylinders 103, 104 and the lever 107, is designed to provide three intermittent vertical motions to the support 109 and the housing 56 supported thereon of different magnitudes, as will appear more clearly in the following description of the operation of the first transfer mechanism. The arcuate actuating means as shown in unit 35 in Figures 3, 7 and 8 includes an arm 99 fixed to housing 56*a* and pivotally connected to one end of link 100. The other end of link 100 is pivotally connected to piston rod 101 extending into hydraulic cylinder 102*a*. This cylinder is fixed to support 109 and forms part of a hydraulic system to be described later herein.

*Operation of the first transfer mechanism*

Figure 12:
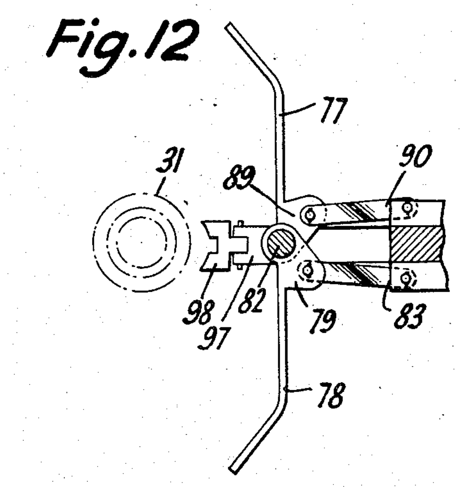
Figure 12 is a view similar to that of Figure 11 except that the object engaging fingers are open.

The operation of the first transfer mechanism involves a cycle that starts with the housings 56, 56*a* and support 109, 109*a* of units 34, 35 in their lowermost position and with the object gripping fingers opened as shown in Fig. 12. These conditions at the start of a cycle are secured as follows. Piston rods 105, 106 (Figure 4) on each of the units are actuated to their maximum downward extent to thereby lower the housings and supports referred to to their lowermost position. The object gripping fingers 77, 78 are opened by energizing cylinder 74 to cause carriage 73 to travel towards the left as viewed in Figure 9, to trip lever arm 69 to the left.

Such motion of the carriage 73 causes lug 76 thereon to engage lever arm 69 and to carry its free end in the direction of travel of the carriage. Since arm 68 is in fixed relation to arm 69, and both constitute an integral lever, the movement of arm 69 in response to the travel of carriage 73 to the left in Figure 9, will cause arm 68 to rotate clockwise against stop member 72. The motion of arm 68 from the substantially straight vertical position where it engages stop member 71 to its angular position against stop member 72 involves the application of a vertical component of motion to the portion of crank 58 to which link 63 is pivoted, through spring 67 and rod 65. Such component of motion applied to crank 58, will cause its opposite slot 60, 60*a*, to move in opposite directions having a horizontal component. The horizontal component of force transmitted to the two upper bars 50, 51, by the walls of slots 60, 60*a*, will cause said bars to move to the left as viewed in Figure 9 and the horizontal component of force applied to the lower bars will cause them to move to the right as viewed in said figure. The travel of bars 50, 51 in an opposite longitudinal direction from bars 52, 53, results in the travel of shaft 82 in a direction opposite to that of bracket 85 and away from said bracket. This results in a travel away from bracket 85 of a portion of links 79 and 89 engaged by shaft 82, and a restraint to such travel by other portions of the links engaged by links 90, 83. These differences in travel of portions of the links 79, 89, will cause fingers 77, 78 to open.

After the units 34, 35 have been lowered as indicated above and the object engaging fingers thereof have opened as shown in Figure 12, each unit is caused to rotate on its pivot 57, 57*a*, as shown in Figure 7 to a position over the belt 30 for engaging the neck portion of a cathode ray bulb. The spreading of fingers 77, 78 as shown in Figure 12 is of sufficient magnitude to retract the fingers out of contact with the neck of a bulb on belt 30 and permit the unit to travel arcuately to a position where the fingers are symmetrically disposed with respect to the neck of the bulb as shown in Figure 3, and in position for gripping the neck when they are actuated to closed position.

The mechanism on each unit for imparting thereto the rotation referred to, comprises the cylinder 102 fixed to support 109, piston 101, link 100, and arm 99 fixed to housing 56. Considering the unit 35, as the piston 101*a* is drawn into cylinder 102*a*, link 100*a* pulls on arm 99 and housing 56*a*, and since housing 56*a* is pivoted at 57*a*, and the cylinder 102*a* is fixed to support 109*a*, the pulling force thereon exerted by link 100 will cause the housing and the members fixed thereto including the fingers 77, 78 to rotate clockwise in a horizontal plane, as viewed in Figure 7.

On reaching its maximum rotary travel in the direction referred to, cylinder 74 is actuated to pull carriage 73 to the right as viewed in Figure 9, as a consequence of which lug 75 engages lever arm 69 and rotates it in a counter-clockwise direction. This actuates crank 58 to cause it to move the upper bars 50, 51 and the lower bars 52, 53 in opposite directions as a result of which shaft 82 approaches bracket 85 and by the action of links 90, 83 causes the fingers 77, 78 to close around the neck of a bulb as shown in Figure 7.

Figures 5 and 6 schematically illustrate the linkage systems employed for giving the units 34, 35, rotary motion and for closing and opening the gripper fingers 77, 78. In Figure 5, which shows the system for rotating units 34, 35, the housing 56 is pivotally mounted at 57 for rotation and an arm 99 integral therewith is engaged by a link 100 pivotally connected to piston 101 associated with cylinder 102 for reciprocating travel. The cylinder 102 and pivotal point 57 are supported on structure 109. Since the cylinder 102 and pivotal point 57 are fixed with respect to structure 109 an outward movement of piston 101 will result in the application of a rotary motion to housing 56 in a clockwise direction, while an inward movement of piston 101 into cylinder 102 will cause the housing to rotate on its pivot 57 in a counterclockwise direction.

In Figure 6 is shown schematically the linkage system controlling the opening and closing of fingers 77, 78. This system includes a lever having arms 68, 69 pivoted on support 70. The free end of arm 68 is pivotally connected to link 63 which in turn is pivotally connected to a crank having arms 58, 60 and 60*a* and pivoted on support 59. Links 62 and 62*a* are pivotally connected to the free ends of arms 60, 60*a*, and to adjacent ends of sliding members 51, 52, supported for sliding motions in guide 55. The other ends of members 51, 52 are integrally connected to downwardly extend portions 82 and 85. The free ends of these downwardly extending portions support a linkage system comprising links 90, 83 pivotally connected at one end thereof to the downwardly extending portion 85. The other ends of the links are pivotally connected to integral portions 89 and 79 of the fingers 77 and 78, respectively.

With the lever 69 pushed to the left as indicated in solid lines, the linkage system shown will operate to open fingers 77, 78. With lever 69 pushed to the right as shown in dotted lines, the linkage system will cause fingers 77, 78 to close.

Figure 8:
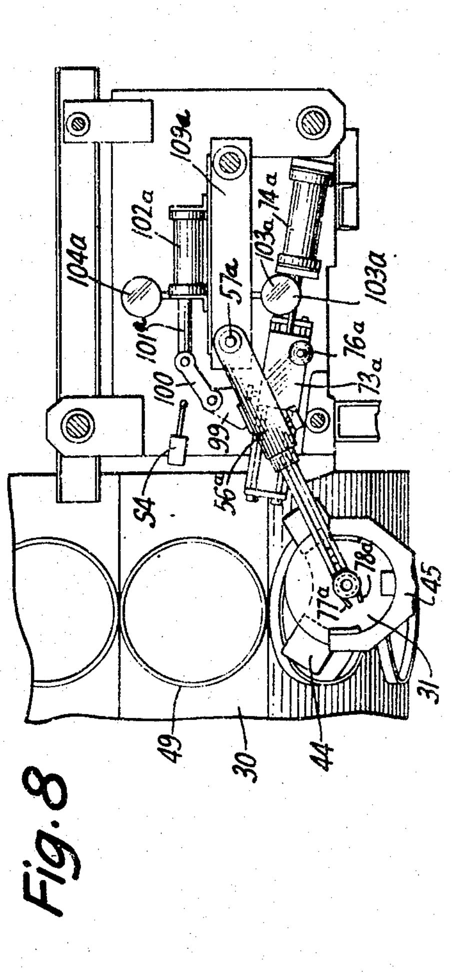
Figure 8 is a plan view of the right hand unit of the first transfer mechanism shown in Figure 7 and shows the unit with its gripper fingers closed in the position of delivering an object to the second transfer mechanism.

After a bulb neck is engaged by fingers 77, 78 as shown in Figures 7 and 9, cylinders 103 and 104 shown in Figure 4, on each of units 34, 35, are actuated to retract both pistons 105, 106, resulting in a maximum raising of the supports 109, 109*a* and housings 56, 56*a*, as well as of the bulb engaged by said fingers. The full retraction of pistons 105, 106 into cylinders 103, 104, raises lever 107 as well as the support 109 connected to lever 107 by bracket 108 and the housing 56 supported on said support, to their uppermost limit, as viewed in Figure 4. Cylinders 102, 102*a* as shown in Figures 3 and 7, are then caused to push out pistons 101, 101*a* resulting in arcuate travel of housings 56, 56*a*. This arcuate travel is of predetermined magnitude and continues until the bulb is in position for lowering onto an object receiving member on the second transfer mechanism, as shown in Figure 8. This object receiving member may be higher than the surface of belt 30, as shown in Figure 4, but not as high as the bulb is raised by the simultaneous actuation of cylinders 103, 104. Therefore, when the bulb is carried to an appropriate horizontal position over the object receiving member of the second transfer mechanism, one of cylinders 103, 104 is actuated to lower the bulb onto said member. This cylinder may be cylinder 103 capable of imparting a larger downward thrust on housing 56 than cylinder 104 by virtue of the differential engagement of housing 56 by lever 107 connecting the pistons 105, 106 of the two cylinders as described before herein. After the housing 56 and the fingers 77, 78 have been lowered the requisite distance, cylinder 74, as shown in Figure 9 is actuated to move carriage 73 to the left as a consequence of which the lug 76 thereon engages lever arm 69 and trips it to the left.

The result of this action as has previously been explained is to open fingers 77, 78 and release the bulb. After the bulb has been released, cylinder 103 or 104 is actuated to lower the housing 56 and fingers 77, 78 to their lowermost position. Cylinder 102 is then actuated to move the housing arcuately to a position over belt 30 as shown in Figure 3, with fingers 77, 78 in open position. As shown in Figure 12, fingers 77, 78 when open, extend radially from the pivot point 57 a lesser distance than the neck of bulb 39, so that clearance is provided between the fingers and the neck of the bulb during arcuate travel of the housing 56. The position of a fresh bulb on belt 30 is determined by bulb holder 49 and is such that the fingers 77, 78 in open position clear the neck portion of such bulb but engage such portion when closed. The first transfer mechanism is then in position to begin a new transfer cycle.

*The second transfer mechanism*

As has been described before herein, the function of the second transfer mechanism, as illustrated schematically in Figure 2, is to receive an object from the first transfer mechanism and deliver it to a receiving or disposal station in an inverted position. This requires that the second transfer mechanism be provided with means for rotating the object in a vertical plane through an arc of 180°. Where the object is a fragile article such as a cathode ray bulb, it is desirable that the engagement of the object by the second transfer mechanism be free from harmful strains on the object. It is also desirable that the rotation of the object be accomplished in such a manner as to require a minimum of space to avoid interference with other structures such as may be included at the receiving or disposal station, which may be an overhead conveyor. The second transfer mechanism therefore includes object supporting members for engaging spaced portions of the object to avoid strains in the object and a support for said members that includes a cradle mounted for rotation and a carriage movable on the cradle to one end thereof for receiving and disposing of an object, and to a position close to the axis of rotation of the cradle for limiting the arc through which the object is carried.

Accordingly the second transfer mechanism as shown in Figures 3 and 4 includes a carriage 42 having at one end thereof object receiving members 44, 45 and mounted for rectilinear travel on cradle 43. Cradle 43 is pivotally supported at 110 for rotary motion in a vertical plane to dispose object receiving members 44, 45 in object transfer relation with respect to overhead conveyor 33.

Object receiving member 44 is a platform fixed to carriage 42 for receiving the face of a bulb 31.

Figure 13:
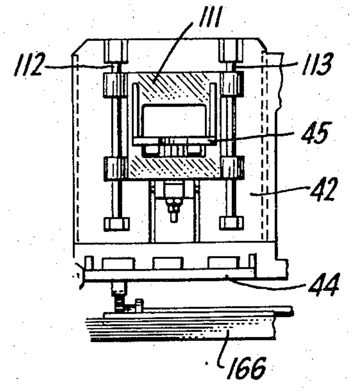
Figure 13 is a front view partly in section of one object receiving member of the second transfer mechanism and shows the support for the object engaging arms thereof for vertical movement.

Object receiving member 45 is provided with two arms as shown in Figure 3 for engaging the conical portion of a bulb and is supported on slide 111 shown in Figure 13, riding on rods 112, 113 in a vertical plane. Means are provided for actuating slide 111 to raised and lowered position. This means as shown in Figure 4 includes lever 114 pivoted at 115 and engaging at one end thereof lug 116 on slide 111. At the other end of lever 114 is mounted a counterweight 117 for urging the member 45 to raised position when carriage 42 is in upright position. Intermediate its pivotal point 115 and engagement with slide 111, lever 114 is engaged by link 118 to lower the arms of member 45 against the force of counterweight 117. Link 118 is connected to lever 119 fixed to shaft 120 which is supported for rotation. Lever 121 is also fixed to shaft 120 and is provided with a pin 122 extending into the line of travel of plate 123 mounted on piston 124 associated with cylinder 125.

Figure 14:
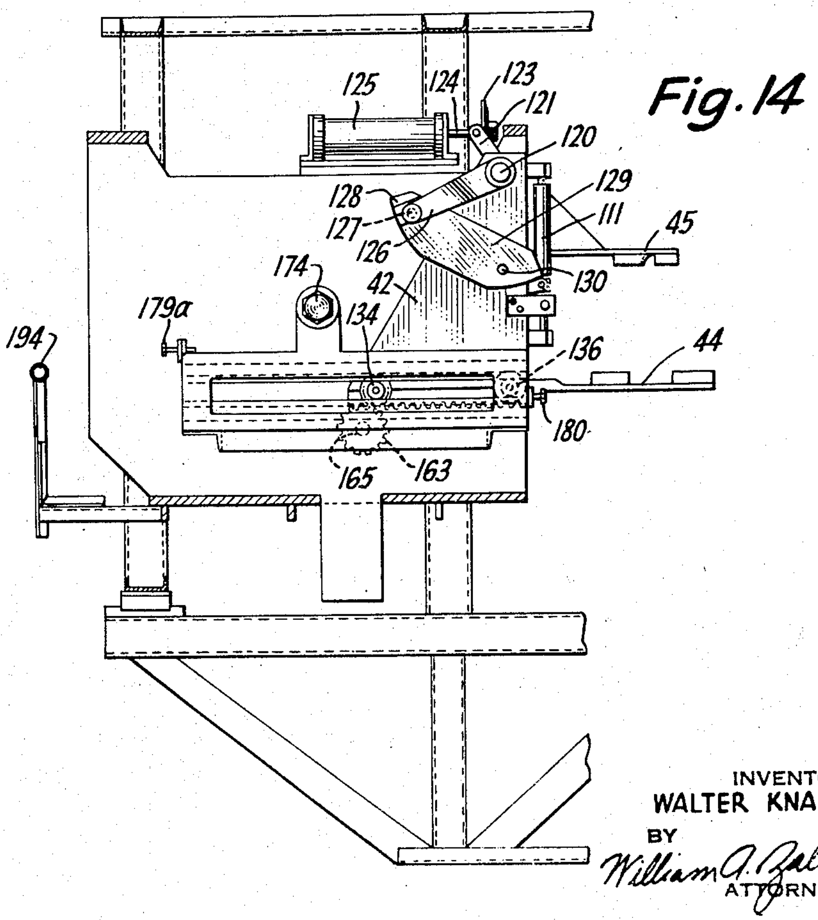
Figure 14 is a longitudinal view partly in section along the line 14—14 of Figure 3 showing elements of the second transfer mechanism and particularly the means for locking the object engaging arms thereof in either lowered or raised position.

Also fixedly mounted on shaft 120, as shown in Figure 14, is a lever 126 having a detent 127 adapted to engage one of a series of steps 128 on plate 129 when the slide 111 is in raised position, and to engage a depression 130 in plate 129 when the slide 111 is lowered. The engagement of detent 127 with either the steps 128 or the depression 130 in plate 129 is sufficiently strong to maintain the member 45 in either its raised position or in its lowered position in engagement with the cone portion of a bulb, during portions of the transfer cycle.

Figure 18:
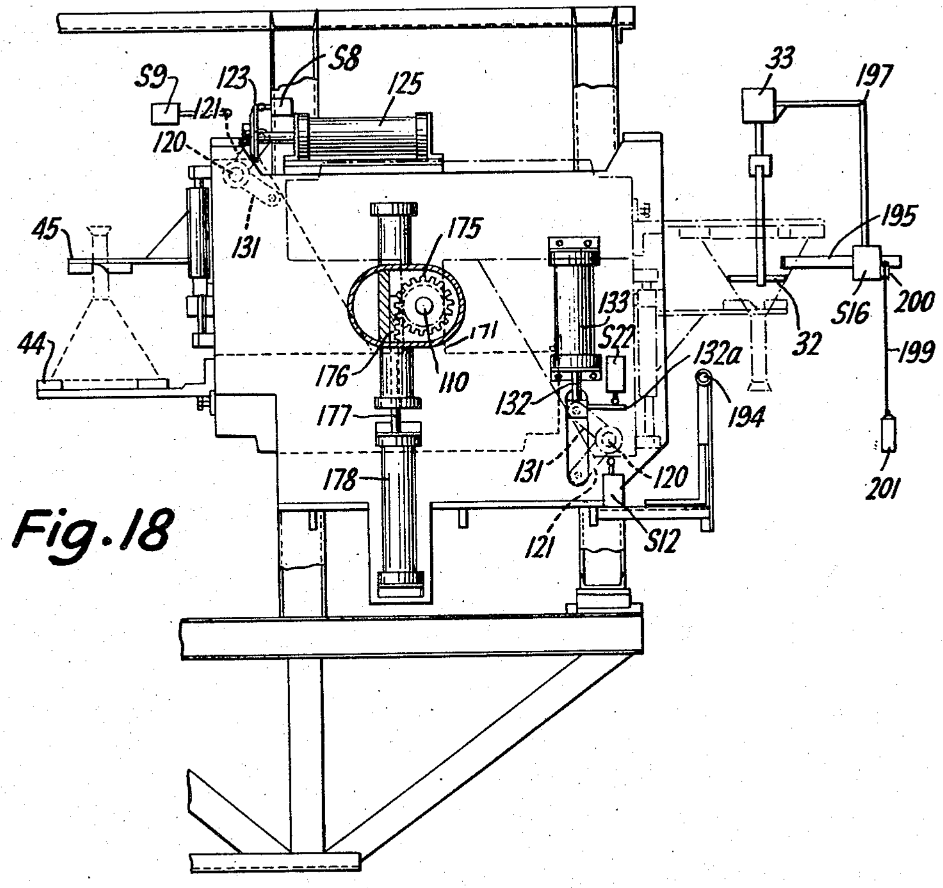
Figure 18 is a longitudinal elevation partly in section along the line 18—18 of Figure 3 and shows the actuating means for rotating the second transfer mechanism in a vertical plane through an arc of 180°.

Lever 121 fixed to shaft 120 is integral with another lever 131 shown in dotted lines in Figure 18. Lever 131 is so oriented on carriage 42 that when the carriage is inverted at the end of a transfer cycle, as shown in phantom in Figure 18, lever 131 is in position to receive a thrust by piston 132 associated with cylinder 133 to cause this lever as well as the lever 119 shown in Figure 4, to move in a counterclockwise direction as viewed in Figure 18 to lower the arms of object gripping member 45 and release the bulb.

Figure 19:
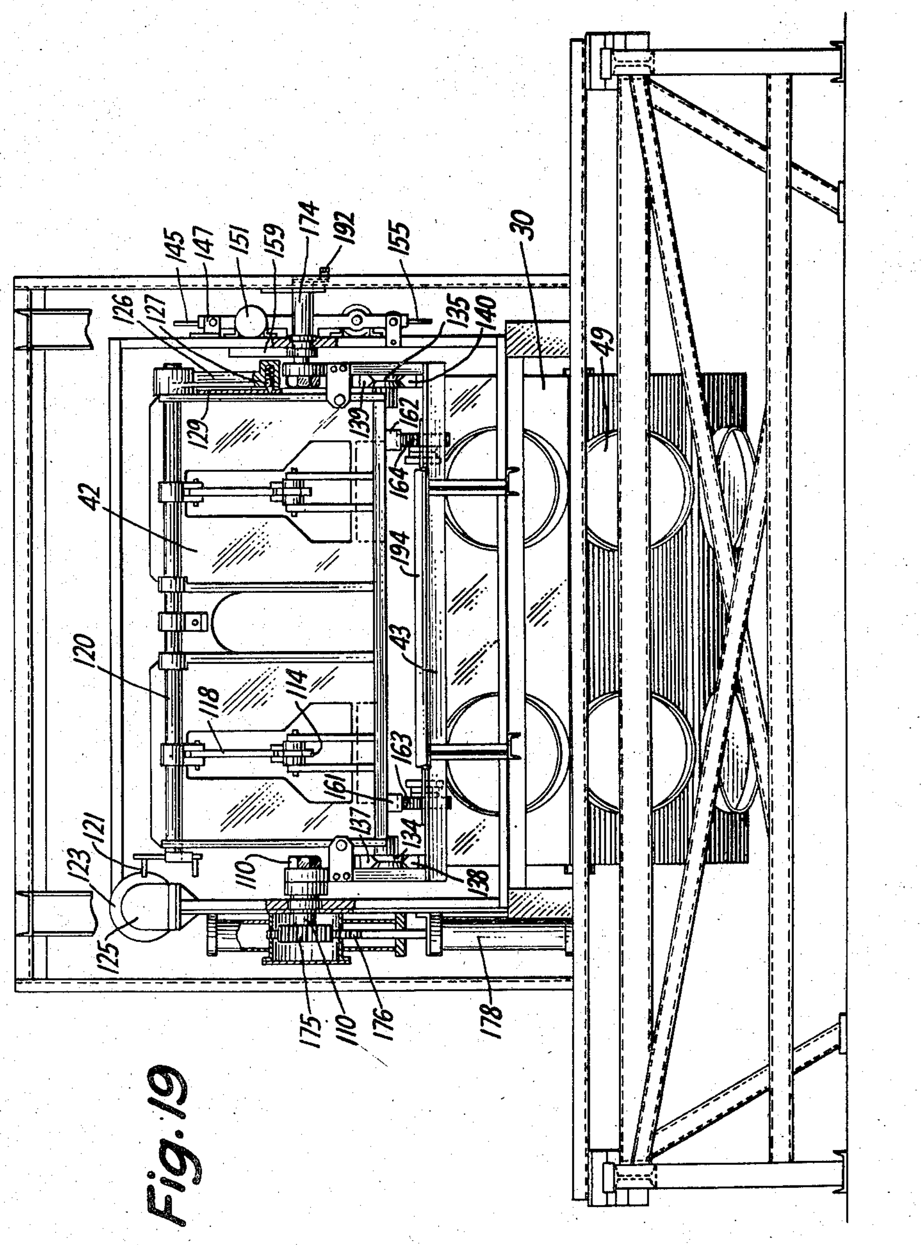
Figure 19 is an end elevation partly in section along the line 19—19 of Figure 3 of the second transfer mechanism of the end thereof remote from the first transfer mechanism and shows a number of details of the second transfer mechanism.

The carriage 42 rides on four bevelled wheels, the two rear wheels 134, 135 being shown in Figure 19 and one of the front wheels 136 being shown in Figure 4. The wheels travel between vertically spaced bevelled rails 137, 138, 139, 140 on cradle 43 shown in Figure 19. The carriage 42 thus rides and is held on the rails whether in upright or inverted position.

Figures 15, 16, 17:
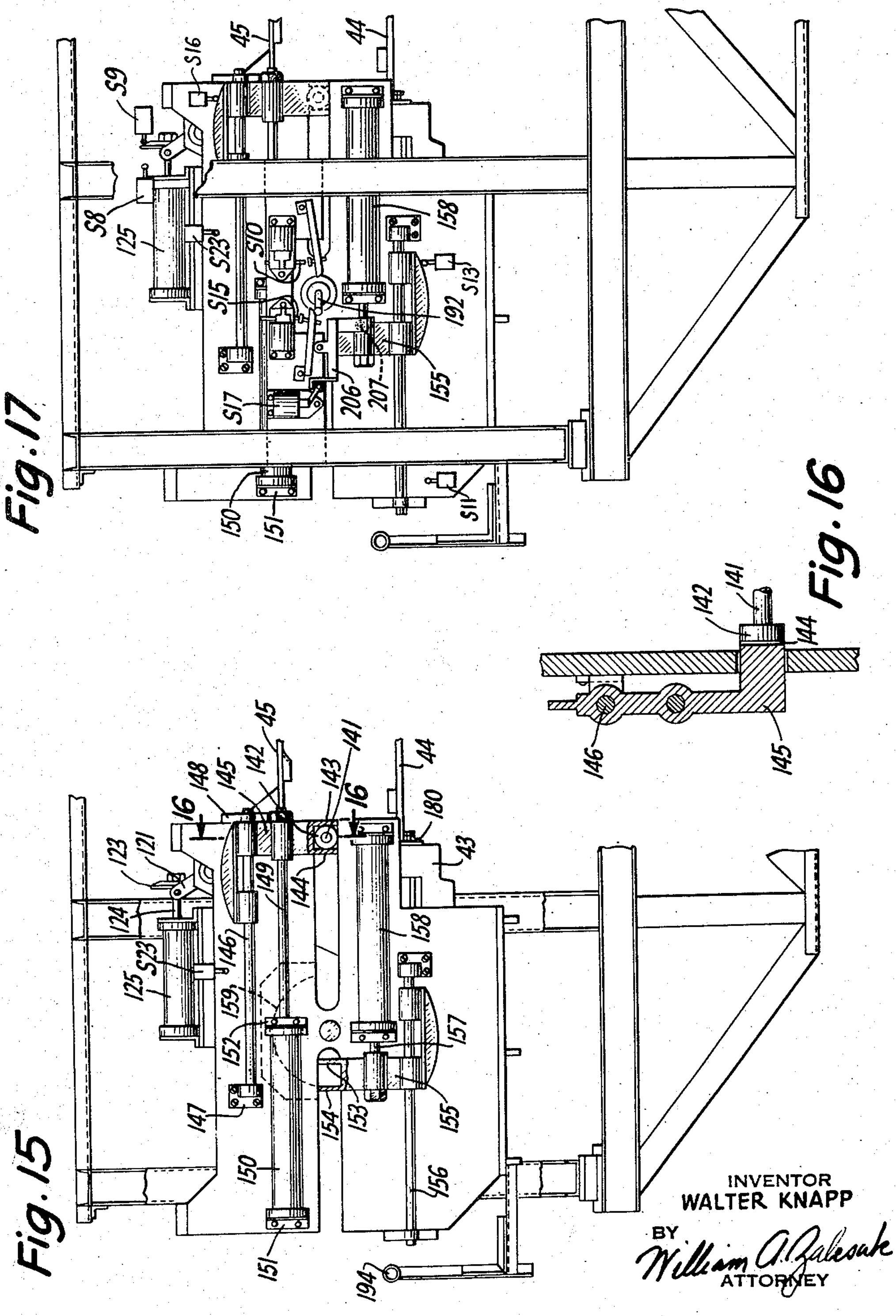
Figure 15 is a longitudinal elevation partly in section along the line 15—15 of Figure 3, and shows actuating means for moving a unit of the second transfer mechanism in a rectilinear path.
Figure 16 is a view along the line 16—16 of Figure 15, and shows a detail of the engaging means of the rectilinear actuating mechanism.
Figure 17 is a side view of the second transfer mechanism along the line 17—17 of Figure 3 and shows switches controlling the rectilinear travel of said mechanism.

Means are provided for moving carriage 42 rectilinearly on the rails 137, 138, 139, 140 on cradle 43. This means comprises a lug 141 fixed to carriage 42 and having a wheel 142 at the free end thereof as shown in Figures 3, 15 and 16 and mechanism for engaging the lug. This mechanism includes two similar units, as shown in Figure 15, the first of which is operable when the carriage 42 is in upright position and the other of which functions when the carriage is inverted. The first unit includes two flat arms 143, 144 lying in parallel vertical planes and spaced to receive wheel 142 of lug 141 in snug engagement. Arms 143, 144 are integral with slide 145 which is mounted on shaft 146 for horizontal rectilinear movement. Shaft 146 is supported on fixed structural elements 147, 148 of the transfer apparatus. The free end of a piston 149 is connected to slide 145 and extends operatively into a cylinder 150. Cylinder 150 is supported on fixed structural elements 151, 152 of the transfer apparatus. This unit is adapted to move the carriage 42 rectilinearly successively to and away from the first transfer mechanism described before herein.

The second unit for rectilinearly moving carriage 42 includes elements similar to those of the first unit disposed to receive the wheel 142 of lug 141 on carriage 42 when the carriage is in inverted position. This unit also includes two flat arms 153, 154 lying in spaced parallel vertical planes and integral with slide 155 riding on shaft 156. Piston 157 associated with cylinder 158 is connected to slide 155.

The wheel 142 is disengaged from one unit and engages the other unit as a consequence of rotation of cradle 43 in a vertical plane, and is guided during said rotation by an arcuate slot 159 shown in dotted lines in Figure 15 in plate 160 shown in Figure 3.

While wheel 142 on lug 141 is positioned on one side of carriage 42, and force applied to wheel 142 might tend to rotate the carriage in a horizontal plane, means are provided for preserving the rectilinear charactei of the carriage travel. This means comprises racks 161, 162 shown in Figure 19, one rack, 161, being shown in Figure 4, fixed to the underside of carriage 42 and engaging spur gears 163, 164 fixed to shaft 165, shown in Figures 3 and 4. Shaft 165 is supported on cradle 43 for rotation on its longitudinal axis. Since the spur gears 163, 164 are fixed to shaft 165, no relative motion therebetween is permitted. Consequently, travel of the carriage 42 on the cradle 43 is restricted to a rectilinear motion.

The cradle 43 comprises a frame including transverse members 166, 167 shown in Figure 4 and side members 168, 169 shown in Figure 3. Side members 168, 169 include arm 170 shown in Figure 4 and arm 171 shown in Figure 18, the free ends of which are pivotally mounted on fixed plates 172, 173 (Figure 3) through shafts 110, and 174 shown in Figures 4 and 19. Side members 168, 169 also support the rails 137, 138, 139, 140 and the shaft 165 to which spur gears 163, 164 are fixed, as shown in Figure 3.

The means for rotating cradle 43 in a vertical plane includes spur gear 175 shown in Figure 18 mounted on shaft 110 fixed to arm 170 of the cradle. Rack 176 engages the spur gear 175 and is connected to piston 177 of cylinder 178 for vertical travel. Such vertical travel imparts rotary motion in a vertical plane to spur gear 176 and the shaft 110 to which it is fixed and, consequently, to the cradle 43. Rack 176 is sufficiently long to successively engage one-half the periphery of spur gear 175, to rotate the spur gear through 180°.

The cradle 43 also includes adjustable stop means for limiting the magnitude of rectilinear travel of the carriage 42 thereon. This means may include stop screws 179, **179*a*, and 180, 180*a***, shown in Figures 3 and 14.

All of the cylinders referred to in connection with the second transfer mechanism are mounted on fixed structural elements of the transfer apparatus. Thus cylinders 125, 133, 150 and 158 for actuating the carriage 42 as well as the cylinder 178 for actuating the cradle 43, are supported on members that are stationary during operation of the apparatus. The conduits connected to these cylinders, as shown schematically in Figure 22 are not therefore subject to wear or fracture that bending or twisting thereof in response to movements of the cylinders might entail.

*Operation of the second transfer mechanism*

The operation of the second transfer mechanism begins after a bulb has been delivered to its bulb engaging members 45, 44 as shown in Figure 8 and the fingers 77, 78 have been opened as explained in connection with the first transfer mechanism. The first action of the second transfer mechanism involves retraction of piston 124 into cylinder 125 shown in Figure 4 which causes plate 123 to engage pin 122 on lever 121 to cause shaft 120 and lever 119 fixed thereto to rotate in a counterclockwise direction. This causes lever 119 to transmit a downard component of force to link 118 and the righthand portion of lever 114 to cause upper object gripper 45 to lower and firmly engage the cone of a bulb. In this position, lever 126, also fixed to shaft 120 as shown in Figure 14 is disposed with its detent 127 in engagement with depression 130 in plate 129, to retain object gripper 45 in engagement with the bulb during a further portion of the cycle of operation of the second transfer mechanism.

After the bulb is firmly engaged by the object supports 44, 45, as indicated above, the wheel 142 on carriage 42, as viewed in Figures 3 and 15, which at the start of the cycle is engaged by arms 143, 144 an slide 145, is moved rectilinearly to the left by the action of piston 149 in entering cylinder 150. This rectilinear movement of carriage 42 continues until the carriage is disposed substantially in the center of cradle 43 and the wheel 142 is directly under the right hand extremity of arcuate slot 159. At the end of this rectilinear movement, piston 177 shown in Figure 18 is extended to cause rack 176 to travel upwardly and rotate spur gear 175 in a clockwise direction. As a consequence of rotation of spur gear 175, the wheel 142 rises to engage slot 159 (Figure 15) and the carriage 42 is rotated in a vertical plane. On completion of rotation through an arc of 180° the wheel 142 on the carriage enters the space between arms 153, 154 of slide 155. Piston 157 is then actuated to move the slide 155 as well as the carriage 42 to the left as viewed in Figure 15 until the carriage, now in inverted position, reaches the rear end of cradle 18, as shown in phantom in Figure 18, and the bulb is in position for transfer to bulb holders 32 on the overhead conveyor 33.

When the carriage 42 has reached the last mentioned position, the mechanism controlling the action of bulb engaging member 45 is actuated. Thus piston 132 is caused to move out of cylinder 133 applying a thrust to lever 131 to rotate shaft 120 in a counterclockwise direction as viewed in Figure 18. This also results in rotation of lever 119 as viewed in Figure 4 in a direction such that link 118 causes lever 114 to act on object engaging member 45 to lower the same. This causes the bulb also to be lowered to a position where it rests on bulb holders 32 of the overhead conveyor 33. The detent 127 on lever 126 as shown in Figure 14 serves to hold the member 45 in this position for the remainder of the cycle.

After a bulb has been delivered in this manner to the overhead conveyor, the carriage 42 is returned to its central location on the cradle 43 by action of the slide 155 engaging the wheel 142 and actuated by piston 157. When wheel 142 is in registry with slot 159, piston 177 is actuated to move rack 176 downwardly resulting in rotation of the conveyor 42 in a direction opposite to its first mentioned rotation and the travel of wheel 142 along the entire length of arcuate slot 159. On completion of rotation of carriage 42 and the arrival of wheel 142 at the righthand end of slot 159 as viewed in Figure 15, piston 149 is actuated to move slide 145 and its wheel engaging members 143, 144 to the right, resulting in rectilinear motion of carriage 42 to the front end of cradle 43 and in position for receiving a further bulb from the first transfer mechanism.

While the operation of the second transfer mechanism has been described in connection with one bulb, it will be understood that in the preferred embodiment of the invention as shown in Figure 3, two similar units are utilized to simultaneously transfer two bulbs.

*Actuating and control system for the transfer apparatus*

The actuating and control system for the transfer apparatus of the invention includes a hydraulic system and a plurality of switches for energizing the hydraulic system in a predetermined manner.

Referring first to the hydraulic system, this includes a series of cylinders, solenoid valves, conduits, and a fluid supply from a reservoir pumped under appropriate pressure, as shown schematically in Figure 22.

Four pairs of cylinders are utilized for actuating the first transfer mechanism as shown in Figure 7. Cylinders 74 and 74A energize the bulb gripping fingers of the two units of this mechanism; cylinders 102 and 102A control the arcuate travel of the two units; cylinders 103 and 103A provide for a long vertical motion of the units while 104 and 104A cause the short vertical movement of the units.

Five additional cylinders serve as the actuating means for the second transfer mechanism. Cylinder 125 in Figure 4 actuates bulb grippers 45 to downward position to firmly engage the bulbs; cylinder 150 moves carriage rectilinearly in upright position and cylinder 158, both shown in Figure 15, moves carriage rectilinearly in inverted position. In Figure 18, cylinder 178 motivates the arcuate indexing of the cradle 43 and carriage 42 and cylinder 133 serves to release the bulb gripper from the bulb when the mechanism is in transfer relation with respect to the overhead conveyor 33.

Each pair of the four pairs of cylinders actuating the first transfer mechanism is connected in parallel to a double acting solenoid valve by two conduits which may be made of a flexible material such as rubber as shown in Figure 22. Thus cylinders 74 and 74A are connected in parallel to solenoid valve 1A—1B by conduits 181 and 181A; cylinders 102 and 102A to solenoid valve 4A and 4B by conduits 182 and 182A; cylinders 103 and 103A to solenoid valves 3A and 3B by conduits 183 and 193A; and cylinders 104 and 104A to solenoid valves 2A and 2B by conduits 184 and 184A.

Each one of the cylinders operating the second transfer mechanism is connected to an independent double acting solenoid valve through rigid conduits. This cylinder 125 is connected to solenoid valve 5A—5B by conduits 185 and 185A; cylinder 133 to solenoid valve 9A—9B by conduits 186 and 186A; cylinder 150 to solenoid valve 6A—6B by conduits 187 and 187A; cylinder 158 to solenoid valve 8A—8B by conduits 188 and 188A; and cylinder 178 to solenoid valve 7A—7B by conduits 189 and 189A.

Each of the valves referred to is connected to manifold conduits 190 and 191 which are controlled by master solenoid valve 10A—10B. A pump, not shown, is employed to provide the necessary pressure of the fluid in the conduits. A reservoir, not shown, stores the required fluid supply.

The solenoid valves, with the exception of 10A—10B may be of a type well known in the art of hydraulics wherein actuation at the B side thereof results in fluid flow in one direction through conduits 181 to 189 and actuation at A results in a fluid flow in the opposite direction. When neither B nor A side is actuated no flow occurs. Valve 10A—10B serves to open and close communication of the fluid between the conduit system and the pressure source.

Each of the double acting solenoid valves is energized by an electrical circuit, not shown, which is controlled by a series of switches or relays, the switches being mounted on the apparatus in a manner to be mechanically tripped or actuated by a moving part of the apparatus. The switches are shown schematically in Figure 22 with arrows indicating the solenoid valves they actuate.

Before the start of a cycle of operation of the transfer apparatus, the first transfer mechanism is in its lowermost position and its object gripping fingers are in open arrangement, Figure 12. The cycle of operation starts with an indexing movement of belt 30, Figure 1, which results in a tripping of switch S1 in Figure 3, by a lever, not shown, on the indexing mechanism of the belt. The tripping of switch S1 energizes solenoid valve 10A to connect conduit 190 with the pump or pressure side of the valve. It also results in actuation of valve 1A retracting the pistons in cylinder 74—74A, closing the gripper fingers around the neck of the bulb, Figure 11. This is accomplished by the piston rod drawing back carriage 73 bringing roller 75 attached thereto into contact with and pulling end of lever 69 into position as shown in Figure 9.

When the carriage 73 as viewed in Figure 9 reaches the end of its travel to the right in response to the retraction of the piston of the cylinder 74 it trips S2, resulting in actuation of valves 2A and 3A causing cylinder 103, 103A, 104 and 104A to raise the housing 56, and its object gripping fingers engaging a bulb, to their uppermost positions (Figure 4).

This raising of the housing results in the tripping of switch S3 shown in Figure 4, due to its engagement with a bracket (not shown) mounted on the front side of the housing. This actuates solenoid valve 4A causing cylinders 102 and 102A to project their piston rods causing rotary motion of housings 56 and 56A and their object gripping fingers toward the second transfer mechanism as viewed in Figure 7.

When the rotary motion places the gripping fingers and the objects engaged thereby in proper position over the platform 44 on the second transfer mechanism, switch S4 is depressed by link 99 on Figure 7. Tripping of the switch S4 results in actuation of valve 2B, causing cylinders 104 and 104A to push out their pistons lowering the housings 56 and 56A and the bulbs in the gripper fingers a predetermined distance to cause the face of the bulb to rest on previously mentioned platform 44.

The partial lowering of the housing by projection of cylinder 104 causes link 107 to depress switch S5 as shown on Figure 4. This contact opens solenoid valve 1B causing cylinders 74 and 74A to project their rods, pushing carriages 73 and 73A as seen on Figure 9 forward and carrying lever 69 to the left opening the gripper fingers as seen in Figure 12.

When the stroke of the cylinder is completed it makes contact with switch S6 actuating solenoid valve 4B causing cylinders 102 and 102A to retract, drawing arms 56 and 56A into their original position as shown on Figure 7 but still being maintained at the predetermined height.

Returning to the initial position brings housing 56 in Figure 3 into contact with switch S7 actuating solenoid valve 5A and causing cylinder 125 to retract to position shown on Figure 18, tripping bell crank 131 and in turn drawing down clamps 45 and 45A (Figure 3) on conical sections of the tubes. Tripping switch S8 (Figure 18) opens solenoid valve 5B causing cylinder 125 to immediately project itself to be ready for the next transfer cycle.

Its projection performs no function in the operation of the mechanism other than to trip switch S9, opening solenoid valve 6A and energizing cylinder 150 as shown in Figure 15. As the piston rod of the cylinder is retracted it results in a rectilinear movement of slide 145 and carriage 42 to the center of housing.

Then slide 145 makes contact with switch S23 energizing solenoid valve 7A and actuating the indexing cylinder 178, the latter being shown in Figure 18. As this cylinder projects its piston rod it pushes gear rack 176 turning gear 175 keyed to trunnion of cradle 43 carrying carriage 42.

As cradle 43 reaches the end of its arcuate travel through a 180° arc it trips switch S10 as shown in Figure 17. This energizes solenoid valve 8A projecting the rod on cylinder 158 and pushing forward slide 155, and carriage 42 in a rectilinear movement but now in an inverted position. When it has reached its furtherest travel position slide 155 makes contact with switch 11.

This opens valve 9A and actuates cylinder 133 shown on Figure 18. The piston rod projecting pushes down lever 131 opening clamp 45 and lowering the tube onto tongs 32 of the conveyor chain.

The lowering of the piston of cylinder 133 brings a lever 132*a* into contact with switch S12 which energizes solenoid valve 8B to retract the piston 157 into cylinder 158 causing rectilinear travel of slide 153 and carriage 42 to the right as viewed in Figure 15.

Travel of slide 155 to the right causes it to engage and trip switch S13 (Figure 17) resulting in actuation of valve 3B which lowers the piston rods 105 of cylinders 103 and 103A, Figure 4, thereby bringing gripper arms 56 and 56A (Figure 8) into receiving position for the next set of bulbs to be removed from the belt conveyor.

The descent of arm 56 to its lowest level makes contact with switch S14 (Figure 3) opening valve 7B which retracts, in Figure 18, piston rod 177 of cylinder 178 to thereby rotate the carriage 42 and cradle 43 in a reverse direction to that of the previously mentioned rotation.

The rotation of the cradle also revolves trip lever 192 in Figure 17 which makes contact with switch S15 which performs 2 functions. It energizes valve 9B, retracting rod 132 of cylinder 133, Figure 18, thus bringing the clamp release lever, not numbered, into position for the next cycle, and at the same time making contact with switch S22 tied in series with switch S16 which is tripped simultaneously on completion of the second function in this sequence.

At the same time switch S15 energizes valve 9B it also opens solenoid valve 6B projecting rod 149 of cylinder 150 causing the carriage 42 and slide 145 to move to the right as viewed in Figure 15. At the completion of its stroke, the slide makes contact with switch S16, on Figure 17, which is, as mentioned before, in series with S22.

These actuate solenoid valve 10B, dumping the load valve and closing the system against further fluid flow until the next cycle.

*Safety devices*

There are also three safety devices associated with the transfer apparatus of the present invention. One of such safety devices comprises means for straightening a bulb on overhead conveyor 33, either while it is deposited thereon by the transfer apparatus, or as a bulb previously deposited, passes the transfer apparatus. This means may comprise a rail 194 shown in Figure 3 having a curved leading end adapted to engage and dispose vertically the neck of a bulb hanging angularly from the overhead tongs 32 and extending in the direction of the transfer apparatus. This straightening of a bulb is desirable to prevent collision thereof with elements of the transfer apparatus or other members extending into the path of travel of an angularly hanging bulb.

Figure 20:
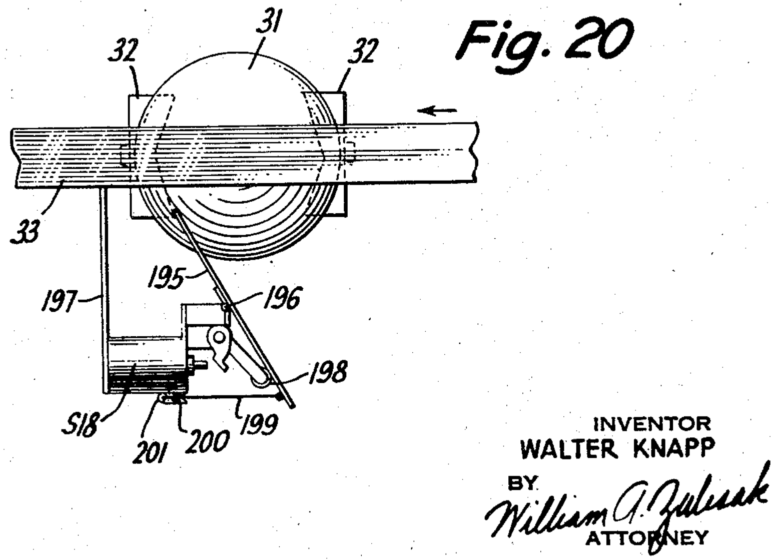
Figure 20 is a plan view of a safety device for controlling the operation of the transfer apparatus.

Another safety device includes means for preventing travel of the carriage 42 to the overhead conveyor 32 after inversion, if the tongs 33 thereof in alignment with the carriage are occupied by bulbs. The overhead conveyor 33, for example, may be of a type associated with a plurality of stations, of which the transfer apparatus of the invention may be one. It is therefore possible that the overhead conveyor may be occupied by bulbs at a portion thereof that is in alignment with the transfer apparatus. To attempt to deliver additional bulbs to tongs of the conveyor that are already occupied might result in breakage of the bulbs. There is provided therefore according to the invention a switching device shown in Figure 20. This switching device includes a paddle 195 extending into the path of travel of a bulb 31 and supported for rotation at 196 on bracket 197 fixed to overhead conveyor 33. Also supported on bracket 197 is a switch S18 engaging the paddle 195 by a wheel 198. The switch S18 is urged by a suitable spring, not shown, to open position. To the end of paddle 195 remote from bulb 31 is connected means for urging the paddle against wheel 198 to close switch S18. This means may comprise a string 199 fixed to the last mentioned end of paddle 195 and engaging pulley 200 having an annular slot in its periphery. To the free end of the string is fixed a weight 201 to pull the paddle against the wheel 198 and close the switch S18. A device of the type described is disposed in alignment with each of the two bulb holders on the carriage 42 of the transfer apparatus. The switch S18 of the safety device is connected in series with switch S10 (Figure 17) across the circuit, not shown, actuating valve 8A to initiate rectilinear travel of the carirage 42 after inversion, to the overhead conveyor 33. Thus, if the tongs of the overhead conveyor in alignment with the transfer apparatus are occupied by bulbs, the paddle 195 will be deflected thereby to open the switch S18 and thereby prevent energization of valve 8A. The switch S18 disposed on the two safety devices in registry with the two bulb holders on the transfer apparatus, are also connected in series with each other. Consequently, if only one pair of the bulb engaging tongs in alignment with the transfer apparatus is occupied by a bulb, the circuit actuating valve 8A will remain open and the carriage 42 will not move towards the overhead conveyor.

The third safety device according to the invention comprises means for holding the overhead conveyor against indexing during the transfer of bulbs by the transfer apparatus to the overhead conveyor. If the tongs 32 on the overhead conveyor should be moved in response to an indexing of the conveyor, while the object engaging members 44, 45 of the carriage 42 extend into the path of travel of the tongs during a transfer operation, serious damage to both the transfer apparatus and to the overhead conveyor might result. Accordingly there is provided as shown in Figure 17, a switch S17 urged by a spring, not shown, to open position, across the circuit, not shown, actuating valve 11B of a system associated with the overhead conveyor 33, shown in Figure 21. Indexing of the overhead conveyor occurs in response to actuation of piston 202. When valve 11A is energized the piston 202 is pushed out of cylinder 181 resulting in travel of slide 203 and its paul 204 to the right. The paul 204 engages the chain 205 to which the tongs 32 are connected, the piston 202 remains in extended position until valve 11B is actuated. Switch S17 is adapted to be engaged by lever 206 (Figure 17) to closed position when slide 155 engages pin 207 extending from lever 206 into the path of travel of slide 155. When the slide is at the end of its movement to the right, pin 207 is engaged thereby resulting in a closing of switch S17. Under this condition, indexing of the overhead conveyor 33 is permitted. However, when slide 155 and carriage 42 move to the left toward the overhead conveyor, pin 207 loses its engagement with slide 155, and switch S17 is free to open in response to the spring referred to. Opening of switch S17 opens the circuit energizing valve 11B as a consequence of which no force is applied to retract piston 202.

It will be noted from the foregoing description of an embodiment of the invention that an advantageous apparatus with desirable safety features is provided for transferring a work piece from one station to another and inverting it. The apparatus is particularly suitable for handling fragile articles such as cathode ray bulbs. To this end the gripping fingers of the first transfer mechanism are resiliently actuated by means including spring 67 (Figure 9) so as not to subject the neck of a bulb it engages to harmful strains. Moreover, the apparatus is adapted for use between stations at which the work piece is disposed on different levels. Thus, the novel linkage of the two cylinders 103, 104 (Figure 4) for vertically moving the first transfer mechanism in two motions of different magnitude permits adjustment of the mechanism to any level at which an object rests prior to engagement by the mechanism.

In addition, the design of the pivoted housings 56 and 56A and their arms and gripper fingers as shown on Figure 7 is such that by relocating the pivotal points 57 and 57A it is possible to swing the arms horizontally about the vertical pivots so that the objects may be carried any predetermined distance and also deposited at varying center distances from each other regardless of the existing center distances at the point of receiving. Furthermore, the novel linkage system for actuating the fingers of the first transfer mechanism to open or closed position permits the fingers to separate sufficiently that they actually retract from the path in which the neck of a bulb lies prior to engagement by the fingers. This retraction permits a simple arcuate motion of the first transfer mechanism in engaging a bulb and carrying it longitudinally to the second transfer mechanism.

The feature of the second transfer mechanism residing in the use of two units for arcuately and rectilinearly transporting an object, is advantageous in that it permits the object to be inverted, and to be moved linearly from a delivery station to a receiving station and to a position whereon the object is substantially at the center of rotation during the arcuate travel of the mechanism. The second transfer mechanism is therefore adapted to accommodate itself to various positions at which an object is received and delivered by the mechanism and reduces the length of the arcuate path through which the object moves during its rotary movement required for inverting it.

The hydraulic system is characterized by freedom from wear due to the stationary mounting of most of the cylinders thereof and the use of linkage systems connecting the cylinders and parts of the apparatus they are designed to actuate. The arrangement of the switches for successive tripping by successively moving parts of the apparatus is advantageous in that it assures a positive control of the movement of the apparatus and mechanically determines the order in which the several movements occur.

The safety devices serve to reduce operator attention to the apparatus, by automatically rendering the apparatus sensitive to undesirable conditions and stopping its operation until the conditions referred to have been corrected.

Due to the many features of adaptability that characterize the apparatus of the invention it is well suited for use in connection with irregularly shaped objects such as cathode ray bulbs and makes it possible to manufacture such objects by mass production methods and by the use of a continuously moving system.

While the means for carrying out the several operations of the apparatus of the invention have been described as constituting specific structures of the embodiment chosen for illustrating the invention, it is to be understood that this is done merely for convenience and to avoid unduly enlarging the specification. Modifications may be made in the various mechanisms described within the realm of equivalents without departing from the spirit of the invention, the scope of which is pointed out in the appended claims.

I claim:

1. An object handling mechanism comprising means for engaging a relatively fragile object, means for rectilinearly moving said engaging means towards a predetermined vertical plane, a rotatable support for said engaging means, a fixed support for said rotatable support, means for rotating said rotatable support through an arc of 180° on an axis in said plane, whereby said engaging means is rotated for inverting said object with reduced strain, power means for said moving means and said rotating means, said power means including electrical and mechanical control means, said electrical control means including a plurality of electrical relays successively actuated by terminal movements of said means for moving and said means for rotating, said mechanical control means including a portion of said fixed support defining a slot having successive rectilinear and arcuate portions and a finger extending from said engaging means and engaging said slot, whereby said mechanical control means is adapted to control rectilinear and arcuate movements of said engaging means on failure of said electrical control means for preserving said object from damage.

2. A transfer mechanism comprising a cradle mounted for rotation, a carriage mounted on said cradle for rectilinear travel thereon, means for rotating said cradle, whereby said carriage is also rotated, and a support for said cradle, said support including a member having a slot rectilinear at end portions thereof and arcuate at an intermediate portion, said carriage having an extension engaging said slot for controlling the rectilinear and rotational movements of said carriage.

3. In a transfer apparatus, a transfer mechanism comprising a cradle supported for rotation through an arc of predetermined angular extent, a carriage supported on said cradle for rectilinear travel thereon in a path of predetermined length during terminal positions of said cradle on said arc, means for rotating said cradle, and means for preventing such rotation during said rectilinear travel of said carriage, said last-named means including a fixed guide having a slot that is arcuate at an intermediate portion thereof and rectilinear at end portions thereof, said guide being mounted for receiving a portion of said carriage in said slot thereof and engaging the same during said arcuate travel of said cradle and the rectilinear travel of said carriage.

4. A transfer mechanism comprising a cradle mounted for rotation, a carriage supported on said cradle for rectilinear movement thereon in upright and inverted positions, means for moving said carriage rectilinearly on said cradle, said means including a power actuated member engaging a portion of said carriage and a guide having a rectilinear portion engaging said member, and means for rotating said cradle, said guide having an arcuate portion engaging said portion of said carriage during rotation of said cradle, said guide being fixed against movement, whereby rotation of said cradle is prevented during rectilinear travel of said carriage thereon.

5. In a transfer apparatus, a transfer mechanism comprising a cradle supported for rotation through a predetermined arc, a carriage supported on said cradle for rectilinear travel thereon in a path of predetermined length during terminal positions of said cradle on said arc, means for rectilinearly moving said carriage in said terminal positions of the cradle comprising two similar units, each including a slide operatively connected to a power source and having two spaced parallel arms extending normal to the direction of said rectilinear travel, a lug on said carriage adapted to fit snugly between said arms, said units being spaced longitudinally of said mechanism for successively engaging said lug during upright and inverted positions of said mechanism, said arms permitting said lug to be disengaged therefrom during said rotation of said cradle, means for rotating said cradle, and means for preventing such rotation during said rectilinear travel of said carriage.

6. A transfer apparatus including a transfer mechanism comprising a cradle mounted for rotation and a carriage supported on said cradle for rectilinear movement thereon, means for actuating said carriage in rectilinear movement, said means comprising two similar units adapted to engage said carriage successively before and after rotation of said cradle, each of said units comprising a power transfer device adapted to be energized by an electrical circuit, a switch for opening and closing said circuit, said switch extending into a terminal portion of the path of rotary travel of a portion of said cradle and adapted to be closed thereby, whereby said carriage is actuated in rectilinear movement.

7. A transfer mechanism comprising a cradle mounted for rotation, a carriage supported on said cradle for rectilinear movement thereon in upright and inverted positions, means for moving said carriage rectilinearly on said cradle, said means including a lug extending from one side of said carriage, a slide having arms for engaging said lug, said arms defining a path for said lug in a direction normal to the direction of said rectilinear movement, power means engaging said slide for rectilinearly actuating said slide for travel in a path of predetermined length, a stationary plate mounted on said mechanism and having a slot therein that is partly rectilinear and partly arcuate, said lug extending through said slot and engaging the rectilinear portion thereof during said rectilinear movement of said carriage, and means for rotating said cradle when said lug on said carriage is in registry with the arcuate portion of said slot, said lug engaging said arcuate portion during rotation of said cradle, whereby rotation of said cradle is prevented during the rectilinear travel of said carriage thereon.

8. A transfer apparatus including a cradle mounted for rotation, a carriage mounted on said cradle for relative movement therewith, an object engaging member on said carriage for receiving an object, said object engaging member including a platform fixed to said carriage and a pair of arms spaced from said platform, a slide mounted for travel to and away from said platform, said arms being fixed to said slide, a plurality of levers mounted on said carriage and fixed at one end thereof to a rotatable shaft, one of said levers at the free end thereof being linked to said slide for moving said slide and said arms toward said platform to accomplish a separation of said arms and said platform, a power source, another of said levers being removably connected to said power source for causing said one of said levers to move said arms to said predetermined separation from said platform, means for yieldingly preserving said separation during the engagement by said object engaging member of said object and rotation of said cradle and rectilinear movement of said carriage, a second power source spaced from said first named power source, and still another of said levers on said carriage engaging said second power source on termination of said rotation and rectilinear movement of the carriage for actuating said separation preserving means to release said object.

9. A conveyor system comprising a transfer apparatus, a conveyor having elements movable in a predetermined path for receiving objects from said transfer apparatus, said transfer apparatus being movable into said path during a transfer operation, and means for de-energizing said conveyor during transfer of an object from said apparatus to said conveyor to prevent collision between said elements and said apparatus, said means comprising a switch disposed in the line of travel of said apparatus and adapted to be opened by the travel of said apparatus to said conveyor, said switch being connected across a circuit energizing said conveyor whereby said conveyor is de-energized when said apparatus moves towards said conveyor for delivery of said objects thereto.

10. A conveyor system comprising a transfer apparatus adapted to invert and rectilinearly transport an object, a conveyor for receiving said object from said apparatus at the end of the rectilinear travel of said object, and means for de-energizing said conveyor during said rectilinear travel of said object to stop said conveyor during transfer thereto of said object, said means comprising a switch urged to open position, a lever engaging said switch to close the same, and a slide connected to said apparatus for rectilinear movement therewith and engaging said lever during a portion of its movement for closing said switch, whereby said switch is adapted to be opened and closed in response to predetermined positions of said slide to stop said conveyor during the transfer thereto of an object from said apparatus and to permit actuation of said conveyor during the absence of such transfer.

11. A conveyor system comprising a transfer apparatus, a conveyor for receiving objects from said transfer apparatus and means for de-energizing said conveyor during transfer of an object from said apparatus to said conveyor, said means comprising a slide on said apparatus rectilinearly moveable in synchronization with an object-engaging member on said apparatus towards said conveyor, a lever pivoted at an intermediate position thereof for rotation, a pin fixed to one end of said lever and extending into the path of travel of said slide away from said conveyor, a switch adapted to successively open and close a circuit energizing said conveyor, said switch extending into the path of rotary travel of the other end of said lever and adapted to be closed by engagement with said other end of said lever when said slide is moved away from said conveyor, said switch being adapted to open said circuit when said slide moves towards said conveyor for de-energization of said conveyor, whereby said conveyor is stationary during transfer of an object by said apparatus to said conveyor.

12. A conveyor system including two spaced conveyors, a transfer apparatus disposed between said conveyors for inverting and automatically transferring an object from one of said conveyors to the other, power means for actuating said transfer apparatus to the other of said conveyors, electrical circuits for energizing said power means, and electrical relays for opening and closing said circuits, one of said circuits being operable to initiate a cycle of operation of said apparatus, one of said relays being mounted adjacent said one of said conveyors, a projection on said one of said conveyors for tripping said one of said relays to closed position whereby operation of said apparatus is started, another of said circuits being operable to move said apparatus to said other of said conveyors, said another of said circuits including two relays, one of said relays being positioned to be closed by a moving part of said apparatus and the other of said relays being closed by a vacancy on said other of said conveyors, whereby said object is delivered to said other of said conveyors only when a vacancy exists thereon.

References Cited in the file of this patent

UNITED STATES PATENTS

| | | |
|---|---|---|
| 928,172 | Bemardin | July 13, 1909 |
| 1,519,256 | Heichert | Dec. 16, 1924 |
| 1,811,832 | Mayers | June 23, 1931 |
| 1,926,041 | Freese | Sept. 12, 1933 |
| 1,991,699 | Reiners | Feb. 19, 1935 |
| 2,052,748 | Bowers | Sept. 1, 1936 |
| 2,092,540 | Talbot | Sept. 7, 1937 |
| 2,259,728 | Bridges | Oct. 21, 1941 |
| 2,293,192 | Campbell | Aug. 18, 1942 |
| 2,371,140 | Alling et al. | Mar. 13, 1945 |
| 2,392,799 | Scholes | Jan. 8, 1946 |
| 2,399,360 | Lacey | Apr. 30, 1946 |
| 2,415,997 | Eldred | Feb. 18, 1947 |
| 2,541,574 | Crooks | Feb. 13, 1951 |
| 2,557,228 | King et al. | June 19, 1951 |
| 2,567,033 | Schutz | Sept. 4, 1951 |
| 2,567,819 | Matteson et al. | Sept. 11, 1951 |
| 2,599,220 | Bergmann | June 3, 1952 |
| 2,619,238 | Miller | Nov. 25, 1952 |